(12) United States Patent
Fries et al.

(10) Patent No.: US 12,179,815 B2
(45) Date of Patent: Dec. 31, 2024

(54) COMPUTER IMPLEMENTED METHOD FOR DETERMINING RAILWAY VEHICLE MOVEMENT PROFILE TYPE OF A RAILWAY VEHICLE MOVEMENT PROFILE AND CONTROLLER OF A TRACK CIRCUIT SYSTEM

(71) Applicant: ALSTOM Holdings, Saint-Ouen-sur-Seine (FR)

(72) Inventors: Jeffrey Fries, Grain Valley, MO (US); Nenad Mijatovic, Melbourne, FL (US); Saleheh Seif, Naples, FL (US); Shilpa Cherian, West Melbourne, FL (US)

(73) Assignee: ALSTOM Holdings, Saint-Ouen-sur-Seine (FR)

( * ) Notice: Subject to any disclaimer, the term of this patent is extended or adjusted under 35 U.S.C. 154(b) by 794 days.

(21) Appl. No.: 17/304,104

(22) Filed: Jun. 14, 2021

(65) Prior Publication Data

US 2022/0396298 A1    Dec. 15, 2022

(51) Int. Cl.
| | | |
|---|---|---|
| *B61L 25/02* | (2006.01) | |
| *B61L 1/18* | (2006.01) | |
| *B61L 13/04* | (2006.01) | |
| *G06F 18/2413* | (2023.01) | |

(52) U.S. Cl.
CPC ............. *B61L 25/021* (2013.01); *B61L 1/181* (2013.01); *B61L 1/185* (2013.01); *B61L 13/047* (2013.01); *B61L 25/025* (2013.01); *G06F 18/2414* (2023.01)

(58) Field of Classification Search
CPC ...... B61L 25/021; B61L 25/025; B61L 1/185; B61L 13/04; B61L 13/047; B61L 2205/04; G06F 18/24137; G06F 18/2414
See application file for complete search history.

(56) References Cited

U.S. PATENT DOCUMENTS

| | | | | |
|---|---|---|---|---|
| 9,026,283 | B2 * | 5/2015 | Baldwin | ............... B61L 29/282 |
| | | | | 701/19 |
| 9,809,235 | B2 * | 11/2017 | Jung | ........................ B61L 27/04 |
| 10,392,040 | B2 * | 8/2019 | Oswald | ................. B61L 25/021 |
| 11,385,066 | B2 * | 7/2022 | Oswald | ................. B61L 25/025 |

(Continued)

FOREIGN PATENT DOCUMENTS

| | | | | |
|---|---|---|---|---|
| EP | | 2660122 A1 * | 11/2013 | .............. B61L 25/02 |
| KR | 20190000028 A | | 1/2019 | |

*Primary Examiner* — Zachary L Kuhfuss
*Assistant Examiner* — Cheng Lin
(74) *Attorney, Agent, or Firm* — Knobbe, Martens, Olson & Bear, LLP

(57) ABSTRACT

A computer implemented method is for determining railway vehicle movement profile type of a railway vehicle movement profile. The railway vehicle movement profile includes a sequence of measured transmitted currents of a transceiver of a track circuit with respect to the time. The method includes obtaining a railway vehicle movement profile, normalizing the railway vehicle movement profile, extracting one or more features from the normalized railway vehicle movement profile, determining the distance of the extracted features with respect to each centroid of a railway vehicle movement profile type determined in a classification process, and assigning the railway vehicle movement profile to the railway vehicle movement profile type with the closest centroid.

13 Claims, 29 Drawing Sheets

(56) References Cited

U.S. PATENT DOCUMENTS

| | | | | |
|---|---|---|---|---|
| 11,780,482 | B2 * | 10/2023 | Mijatovic | B61L 1/185 |
| | | | | 246/473 R |
| 11,851,096 | B2 * | 12/2023 | Shahbazi Avarvand | ...................... |
| | | | | G06F 18/214 |
| 2021/0269077 | A1 * | 9/2021 | Speckmeier | B61L 27/57 |
| 2021/0276601 | A1 * | 9/2021 | Mijatovic | B61L 25/026 |
| 2022/0358163 | A1 * | 11/2022 | Makhija | G06F 16/3344 |

\* cited by examiner

True Reference Curve

COMPUTER IMPLEMENTED METHOD FOR DETERMINING RAILWAY VEHICLE MOVEMENT PROFILE TYPE OF A RAILWAY VEHICLE MOVEMENT PROFILE AND CONTROLLER OF A TRACK CIRCUIT SYSTEM

FIELD OF THE INVENTION

The present invention concerns a computer implemented method for determining railway vehicle movement profile type of a railway vehicle movement profile based on a plurality of measured transmitted currents of a transceiver of a track circuit.

According to another aspect, the present disclosure concerns a controller of a track circuit system including a transceiver being connected to a pair of rails of a railway track and a controller receiving from the transceiver measured transmitted currents, wherein the controller is adapted to obtain the railway vehicle movement profile.

Further, the present disclosure is related to computer-readable non-transitory storage medium comprising instructions.

BACKGROUND OF THE INVENTION

KR 2019000028 relates to a train position detection apparatus using an audio frequency track circuit. The distance is determined based on the impedance.

U.S. Pat. No. 9,026,283B2 discloses Dynamic Time Warping (DTW) methods to compare magnetic sensor data to determine degree of match to an expected waveform for a train movement.

Track circuits may be used to locate the position of a train within a signalled block for the purpose of enabling virtual signalling within advanced train control systems. These virtual block track circuits use the measured amount of current transmitted into the front axles of an approaching train, or the rear axles of a receding train to determine where in the signalled block the nearest axle is located.

SUMMARY OF THE INVENTION

When track circuit data is used to locate the position of a train within a signaled block, there can be errors in the determined location, which are biased by the railway vehicle movement profile. For example, if the railway vehicle were to accelerate at a point along the track, it may introduce bias into the computer determined relationship between track circuit data and train position. It is generally true that the larger the acceleration, the larger the bias that may be introduced. The same observation can be made for railway vehicle deceleration. Therefore, it is important to understand when a railway vehicle may be accelerating or decelerating significantly, such that it can be handled appropriately to optimize the accuracy in the computer determined relationship between track circuit data and train position.

Based on the track circuit data and the train position, speed enforcement and vital positive stop functions can be used to control a train such that it does not go past a boundary or exceed the safe limits of operation.

According to one aspect, the invention concerns a computer implemented method for determining railway vehicle movement profile type of a railway vehicle movement profile, wherein the railway vehicle movement profile comprises a sequence of measured transmitted currents of a transceiver of a track circuit with respect to the time, comprising
- obtaining a railway vehicle movement profile;
- normalizing the railway vehicle movement profile;
- extracting one or more features from the normalized railway vehicle movement profile;
- determining the distance of the extracted features with respect to each centroid of a railway vehicle movement profile type determined in a classification process; and
- assigning the railway vehicle movement profile to the railway vehicle movement profile type with the closest centroid.

According to a further aspect, a computer-readable non-transitory storage medium comprising instructions is provided, which when executed by a computer, cause the computer to carry out the following steps:
- obtaining a railway vehicle movement profile, wherein the railway vehicle movement profile comprises a sequence of measured transmitted currents of a transceiver of a track circuit with respect to the time;
- normalizing the railway vehicle movement profile;
- extracting one or more features from the normalized railway vehicle movement profile;
- determining the distance of the extracted features with respect to each centroid of a railway vehicle movement profile type determined in a classification process; and
- assigning the railway vehicle movement profile to the railway vehicle movement profile type with the closest centroid.

According to another aspect, a controller of a track circuit system is provided, the track circuit system including a transceiver being connected to a pair of rails of a railway track and the controller receiving from the transceiver measured transmitted currents, wherein the controller is adapted to:
- obtain a railway vehicle movement profile, wherein the railway vehicle movement profile comprises a sequence of measured transmitted currents of a transceiver of a track circuit with respect to the time;
- normalize the railway vehicle movement profile;
- extract one or more features from the normalized railway vehicle movement profile;
- determine the distance of the extracted features with respect to each centroid of a railway vehicle movement profile type determined in a classification process; and
- assign the railway vehicle movement profile to the railway vehicle movement profile type with the closest centroid.

The method steps may be performed by way of hardware components, firmware, software, a computer programmed by appropriate software, by any combination thereof or in any other manner.

BRIEF DESCRIPTION OF THE DRAWINGS

So that the manner in which the above recited features of the present invention can be understood in detail, a more particular description of the invention, briefly summarized above, may be read by reference to embodiments. It is to be noted, however, that the appended drawings illustrate only typical embodiments of this invention and are therefore not to be considered limiting of its scope.

The accompanying drawings relate to embodiments of the invention and are described in the following.

DETAILED DESCRIPTION OF THE PREFERRED EMBODIMENTS

Figure 1:
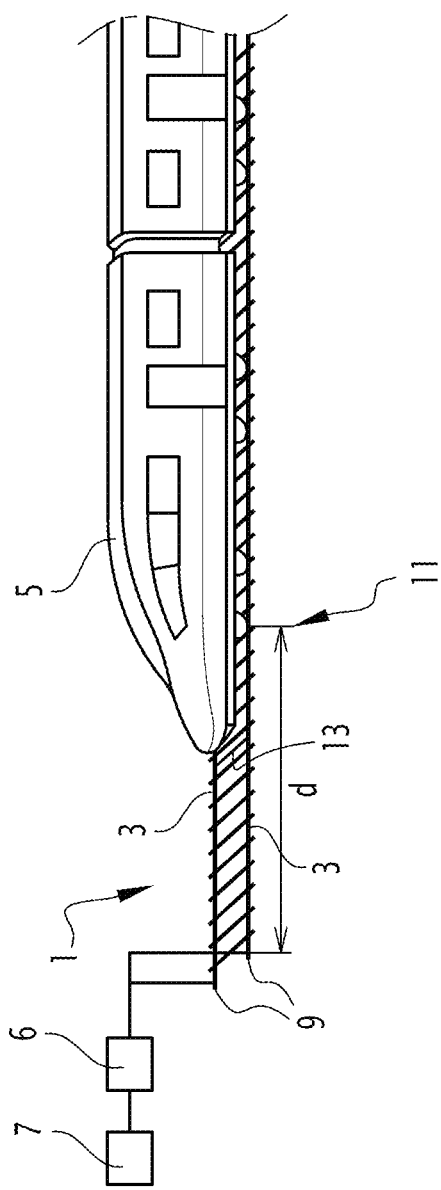
FIG. 1 shows schematically the track circuit system according to the invention.

FIG. 1 shows schematically the track circuit system 1 according to the invention. The track circuit system 1 includes a track with two rails 3 and a railway vehicle 5 that can move on the rails 3 of the track. A railway vehicle may be a locomotive, a train, a multiple unit or the like. The track circuit system 1 includes further a transceiver 6, which is coupled to the rails 3. A controller 7 is adapted to command the transceiver 6, to transmit signals to the rails 3 and/or to receive measurement results from the transceiver 6.

The transceiver 6 can emit a signal on one or both of the rails 3. The signals are fed into the rails 3 at feed in points 9. According to embodiments, the track circuit is a DC track circuit. In alternative embodiments, the track circuit may be an AC track circuit. In other words, the track circuit signal is emitted by the transceiver 6. Further, the transceiver 6 is adapted to measure the transmitted current of the track circuit signal. The measured transmitted current of the transceiver 6 is provided by the transceiver to the controller 7. In some embodiments, the transceiver is adapted to measure the transmitted currents at regular time intervals.

The controller 7 is adapted to collect a plurality of measured transmitted currents and to store them as a sequence of measured transmitted currents with respect to the time. The sequence of measured transmitted currents with respect to the time may form a railway vehicle movement profile, in particular if during the measurement time a railway vehicle passes along the track.

In embodiments, the railway track is divided into one or more blocks. In case of a plurality of blocks, these are arranged in sequence along the railway track. In the embodiment shown in FIG. 1, only a portion of a single block is shown.

The wheels and the axle of the railway vehicle provide a short cut between the rails 3 of the same track. The measured transmitted current of the transceiver 6 depends on the position of the railway vehicle. The measured transmitted current is reduced in case the railway vehicle 5 moves away from the feed in points 9.

According to embodiments, the measured transmitted current is used to determine the distance between the nearest axle 11 of the railway vehicle 5 with respect to the feed in points 9. The nearest axle may be the rear axle 11 of a receding railway vehicle 5 or a front axle 11 of an approaching railway vehicle 5. The feed in points 9 are the points, where the transceiver 6 is electrically connected to the rails 3.

In other words, track circuits may be used to locate the position of the nearest axle 11 of the railway vehicle 5 within a block towards the feed in points 9, in particular for the purpose of enabling virtual signaling. For example, such a system may be used within advanced train control systems.

In some embodiments, some shunts 13 are selectively provided at one or more predetermined positions in the railway track between the two rails 3, in order to calibrate the track circuit system 1. For example, a shunt 13 may selectively electrically connect the two rails at one or more predetermined, known positions, so that the track circuit may be calibrated. The shunt 13 then simulates axle and wheels of the railway vehicle 5 and a specific position.

As described above, track circuits use the measured amount of current transmitted to the nearest axle 11 of the railway vehicle 5 to determine where in the signalled block the nearest axle 11 is located.

Typically, the relationship between transmitted current and the location of the nearest axle 11 of the railway vehicle 5, which may be determined based on the determined distance between the feed in points 9 and the nearest axle 11 of the railway vehicle 5, cannot be presented analytically, for example by using linear models.

For example, the relationship between transmitted current and the distance between the feed in points 9 and the nearest axle 11 may also be different between geographical locations, due to different factors, such as track circuit length, rail resistance, ballast resistance, train axle resistance, weather conditions, etc.

Therefore, according to an embodiment, which may be combined with other embodiments disclosed herein, a data driven method is used to automatically determine the relationship between transmitted current and railway vehicle location using the data collected from many passing railway vehicles.

The relationship to be understood is transmitted current versus location (or distance between the nearest axle 11 railway vehicle 5 and the feed in points 9). According to the invention, a dynamic time warping (DTW) method is used.

A DTW method may be used to determine a similarity between two sequences. For example, the sequences, here of the transmitted currents, may vary with respect to a speed of the railway vehicle. DTW is a method, which may calculate a match between two given sequences. For that purpose, every time index from a first sequence is matched with one or more indices from another sequence, or vice versa. The mapping of the indices from the first and second sequence must be monotonically increasing and vice versa.

According to embodiments, the DTW method is used to translate or transform the time domain to a relative time domain, for example the distance d between the nearest axle 11 of the railway vehicle 5 and the feed in points 9.

Figure 2:
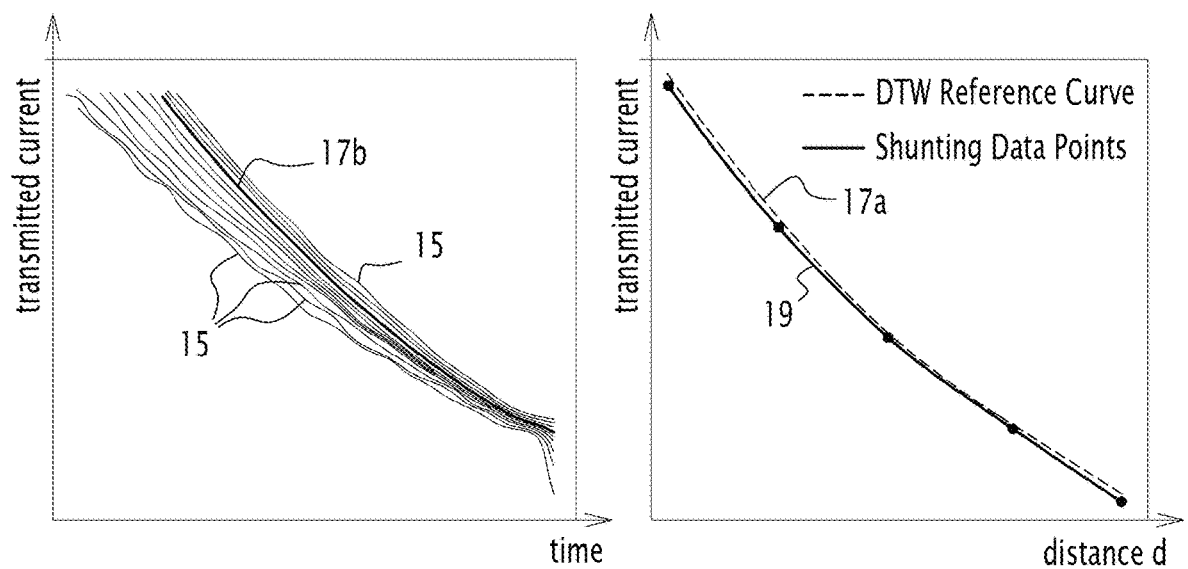
FIG. 2 shows schematically the estimation of a location using a DTW method.

FIG. 2 shows an example of a DTW method. On the left side, the small curves 15 show the transmitted current of several railway vehicles which are passing along the railway track including the rails 3, collected versus time to estimate the transmitted current versus railway vehicle distance d (dotted curve 17a in the right graph) using the DTW process.

For that purpose, each of the curves 15 in the transmitted current vs. time domain, which is also called transmitted current with respect to the time in the present disclosure, is transformed to a transmitted current vs. distance domain using the dynamic time warp (DTW) method. Then, from the plurality of curves a reference curve 17a is calculated, for example by calculating a mean value.

In the right diagram of FIG. 2, a comparison of the DTW estimation (dotted curve 17a) to the true relationship (continuous curve 19) shows a very good match. The continuous curve 19 is generated by using shunts 13 in the rails at specific locations. For these locations, the transmitted current is measured. Then, an interpolation is performed to generate the continuous curve 19 in the right diagram.

The movement of the railway vehicles 5 are randomly selected and include railway vehicles with constant speed, railway vehicles with increasing speed and railway vehicles with decreasing speed. The thick curve 17b in the left diagram corresponds to a projection or transformation of the curve 17a into a transmitted current vs. time diagram.

In an embodiment, the maximal value of the distance d in the right diagram corresponds to the lengths of a block of a railway track.

The above steps using in particular the DTW method is used to avoid calibrating data in a manual way periodically, for example by using shunts.

Once this relationship is established, the track circuit data can be used to provide real time train location, which supports better railway vehicle detection resolution and allows more track capacity.

While the Dynamic Time Warping (DTW) method used can translate the captured transmitted current from an absolute time domain to a common, relative time domain (which corresponds in the present case to a distance d, in particular the distance of the closest axle 11 of the railway vehicle 5 to the feed in points 9), there are errors that can occur based on acceleration or deceleration of passing railway vehicles.

As an example, if all passing railway vehicles 5 used to calibrate the track circuit system 1 accelerate at the same location, there will be a bias or error in the relationship between transmitted current and railway vehicle location or distance using the above calibration method comprising a DTW method.

Figure 3:
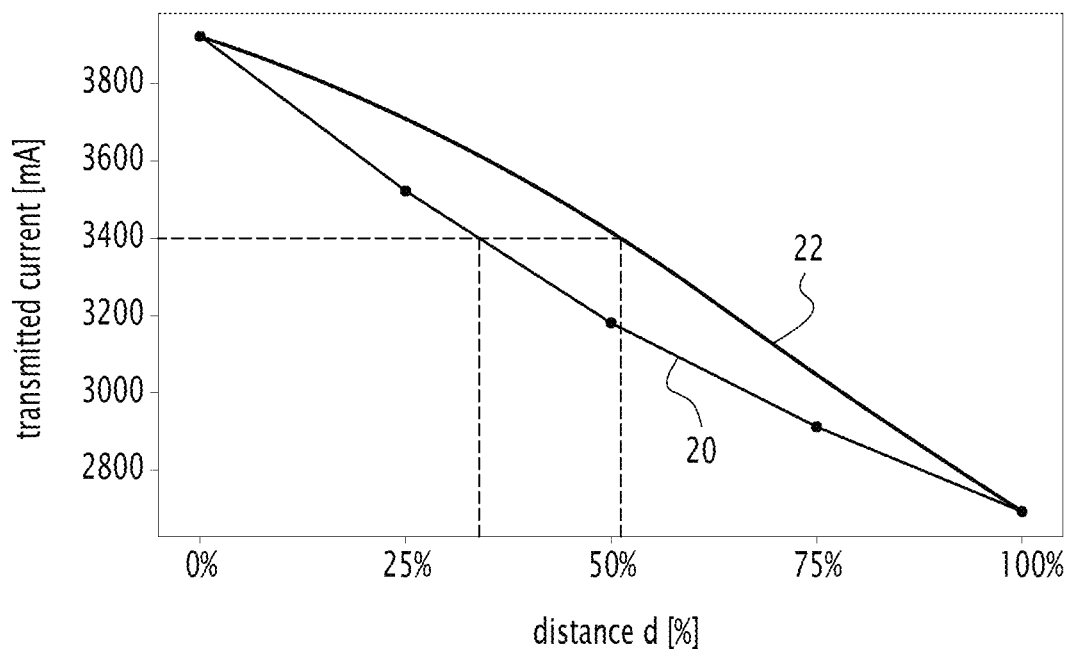
FIG. 3 shows a comparison between the true location and the estimation using a DTW method of an accelerating railway vehicle.

FIG. 3 shows a comparison between the true relation between the transmitted current and the distance (shown as thin line 20), corresponding to the continuous curve 19 in the right diagram of FIG. 2, and the estimation or calibration comprising a DTW method (shown as the DTW reference curve 22) if only accelerating railway vehicles are taken into account. For a given level of transmitted current of 3400 mA, the DTW reference curve (curve 22) would show the railway vehicle further away from the transceiver 6 or the feed in points 9 compared to the true relationship (curve 20), which for following railway vehicles is in the unsafe direction.

In the following a method steps are presented, which may be used to avoid biasing errors. These method steps may be used in a method for calibrating a track circuit. For example, the method steps are provided to identify railway vehicle acceleration and to remove those measurements from the set of measurement results, which are used to calibrate the system according to the method described with respect to FIG. 2.

In other embodiments, the methods steps may be used in a method for estimation of a distance d of a railway vehicle 5, in particular the distance between the nearest axle 11 of a railway vehicle 5 to feed in points and the feed in points 9.

Figure 4:
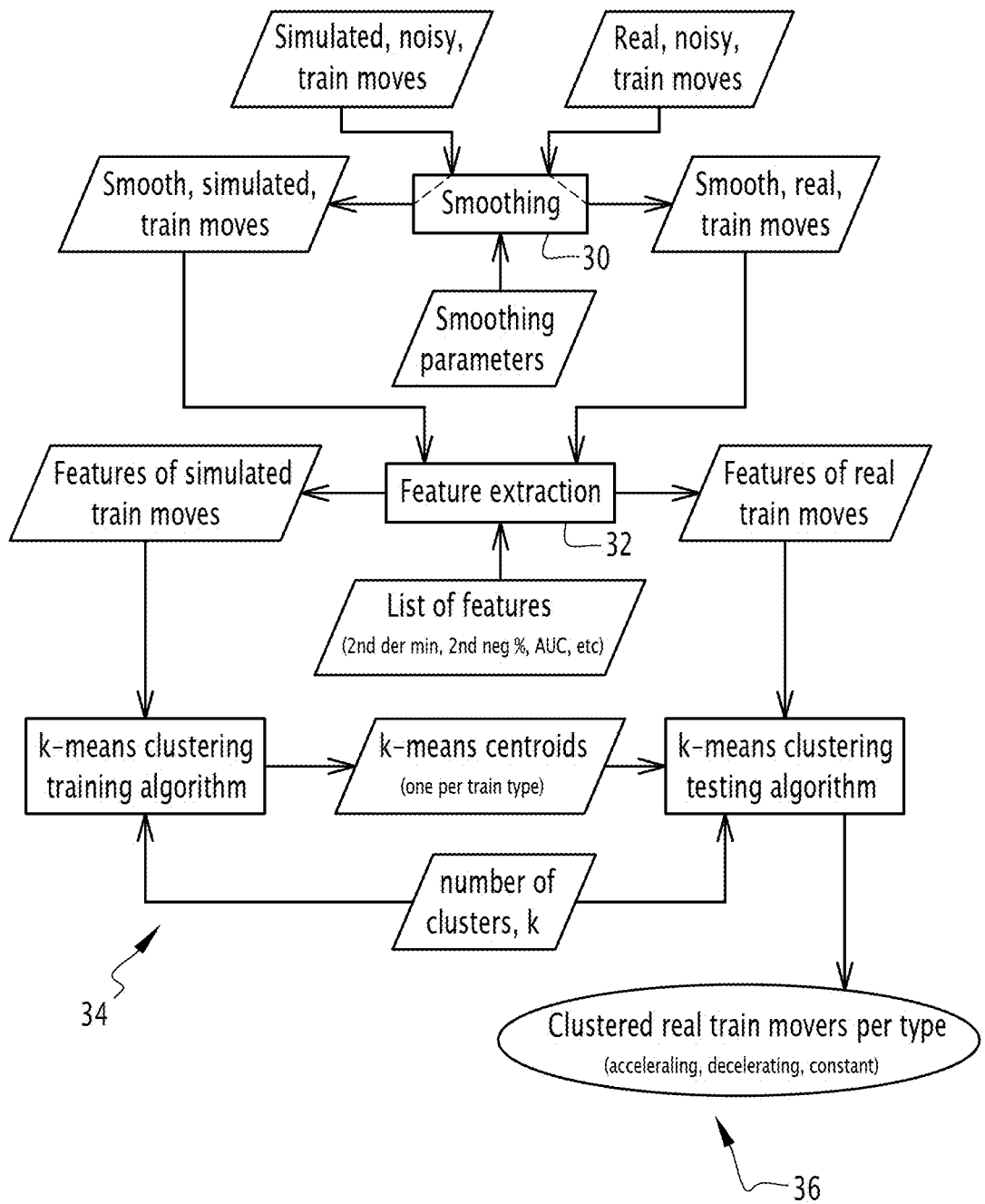
FIG. 4 shows a flow chart of a method according to an embodiment of the present disclosure.

FIG. 4 shows a flow chart for a method according to an embodiment of the present disclosure.

The flow chart FIG. 4 shows three main steps, which are used with simulated (on the left side) and with the real data (on the right side). The simulated and the real data corresponds to the transmitted current, which is measured at constant time intervals. In other words, the data include railway vehicle movement profiles comprising a sequence of transmitted currents with respect to the time.

Figure 14:
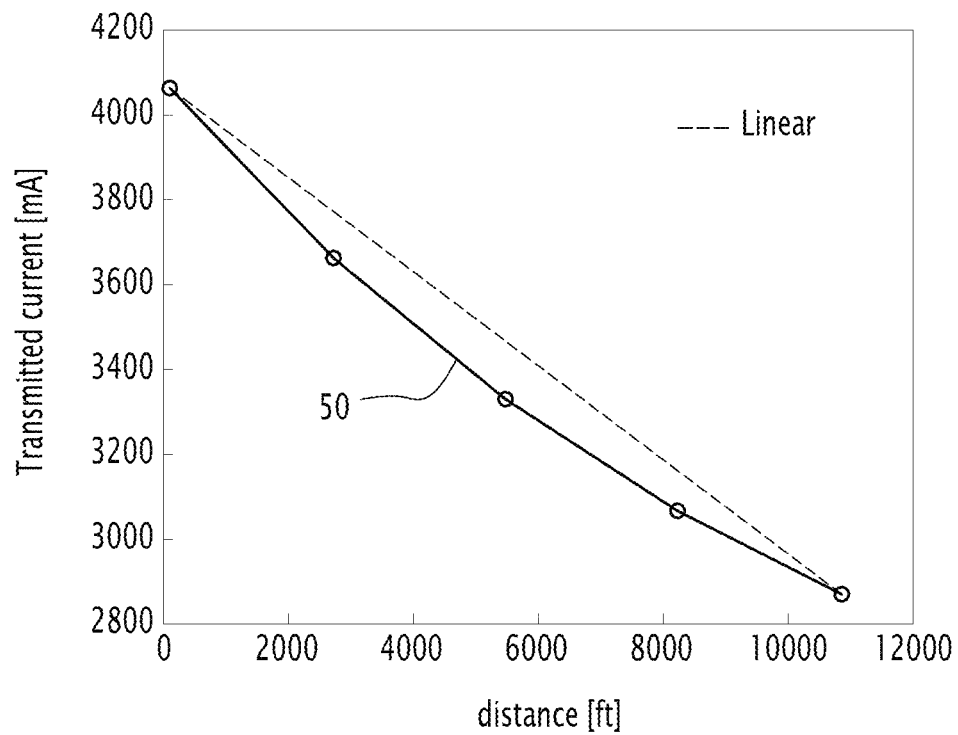
FIG. 14 shows a reference curve establishing a relationship between the distance and the measured transmitted current.

The simulated railway vehicle movement profiles, for example like the curves 15 in FIG. 2, are calculated with different railway vehicle movement profile types of railway vehicle as it will be explained in further detail with respect to FIG. 14 in detail. For example, some railway vehicles are moving with a constant speed, while others are accelerating or decelerating. The simulated transmitted current depends on other fixed parameters, which can be set for the track, for example the ballast resistance, the material of the rail etc. The simulated movement profiles may be also considered as reference railway vehicle movement profiles, which are in particular used to learn the system 1.

In the following different steps of the flow chart of FIG. 4 are explained.

In a first, optional, step 30, the data is smoothed. This will be further explained with reference to the FIGS. 5 to 8. In a second step 32 the features are extracted, which is explained with respect to FIGS. 9 to 13, and in a third step 34 the railway vehicle moving profiles are classified, which is explained with respect to FIGS. 14 to 19A. The classification can be then used for classifying real railway vehicle moving profiles as it will be explained with respect to FIGS. 20 to 26, which corresponds to the portion 36 of the flow chart of FIG. 4.

In the following with respect to FIGS. 5 to 8, the smoothing of the moving profiles of the railway vehicles is explained. As explained above, a railway vehicle moving profile represents the transmitted current of a track circuit with respect to the time, in particular within a block of a railway track. The transmitted current is measured in embodiments in regular time intervals.

Figure 5:
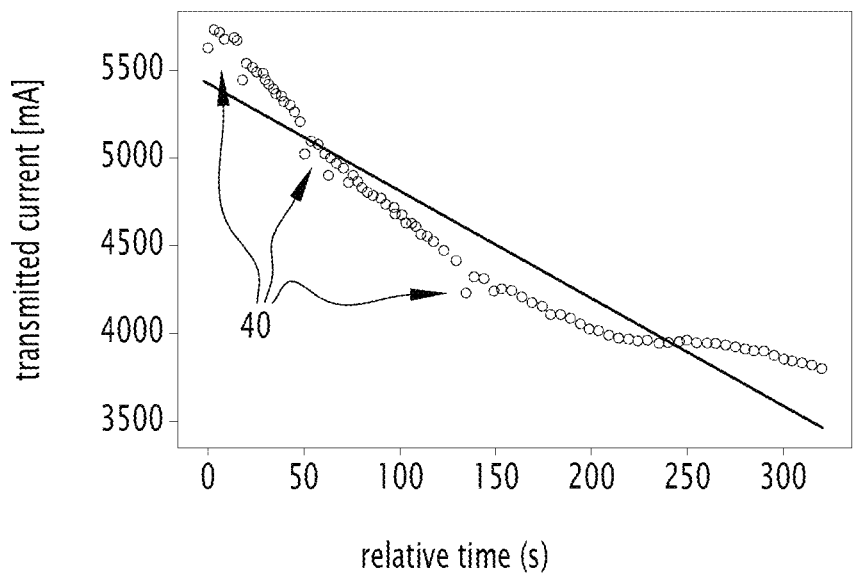
FIG. 5, shows a curve of an example of transmitted current measurements of a railway vehicle.

FIG. 5, shows a curve of an example of railway vehicle moving profile. As it can be seen in FIG. 5, the transmitted currents of the railway vehicle moving profile include some noisy samples 40. In order to better visually show the railway vehicle moving profile, also a straight diagonal line is included in the drawings. Each measurement point is shown as a circle.

According to embodiments, the railway vehicle moving profile can be smoothed using different methods.

In an embodiment, an exponential filter may be used to smooth the railway vehicle moving profile.

Figure 6:
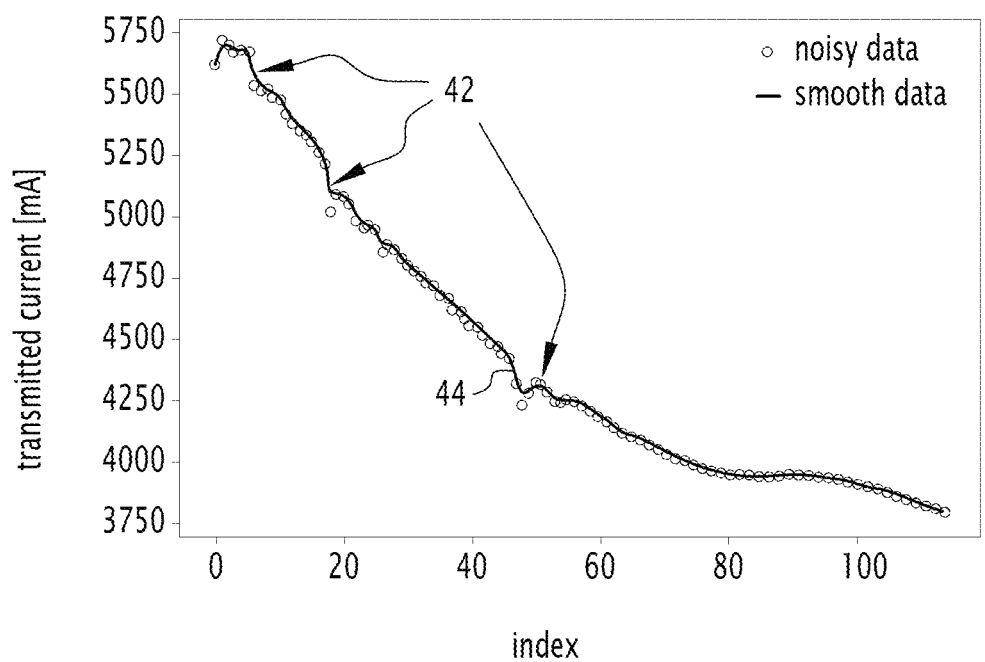
FIG. 6 shows the curve of FIG. 5, which has been smoothed with an exponential filter.

FIG. 6 shows the railway vehicle moving profile of FIG. 5, which has been smoothed with an exponential filter. The smoothed railway vehicle moving profile is shown with the continuous curve 44. The circles correspond to the measurement points, which have already be shown in FIG. 5.

The index in the horizontal axis corresponds to the time domain. Each index point represents a specific time at which a measurement of the transmitted time took place.

An exponential filter is used to remove outliers and find trends by exponentially aging, the samples from the past by some value, commonly referred to as an aging parameter. In the example of FIG. 6, an exponential filter is used with an aging parameter a set to 0.65. As it can be seen at points 42, the exponential smoothing removes some local signal disturbances. For example, the exponential filter may use the following formula, where the observation begins at time t=0:

$$S_0 = X_0, \text{ for } t=0,$$

$$S_t = \alpha x_t + (1-\alpha)S_{t-1}, \text{ for } t>0 \quad \text{Equation (1)}$$

$S_t$ is the output of the smoothing algorithm and the raw data sequence is represented by $x_t$ beginning at the time t=0, and a is the aging parameter or the smoothing factor, with $0 \leq \alpha \leq 1$.

In another embodiment, a Savitzky-Golay filter may be used to smooth the railway vehicle moving profile of a railway vehicle 5.

Figure 7:
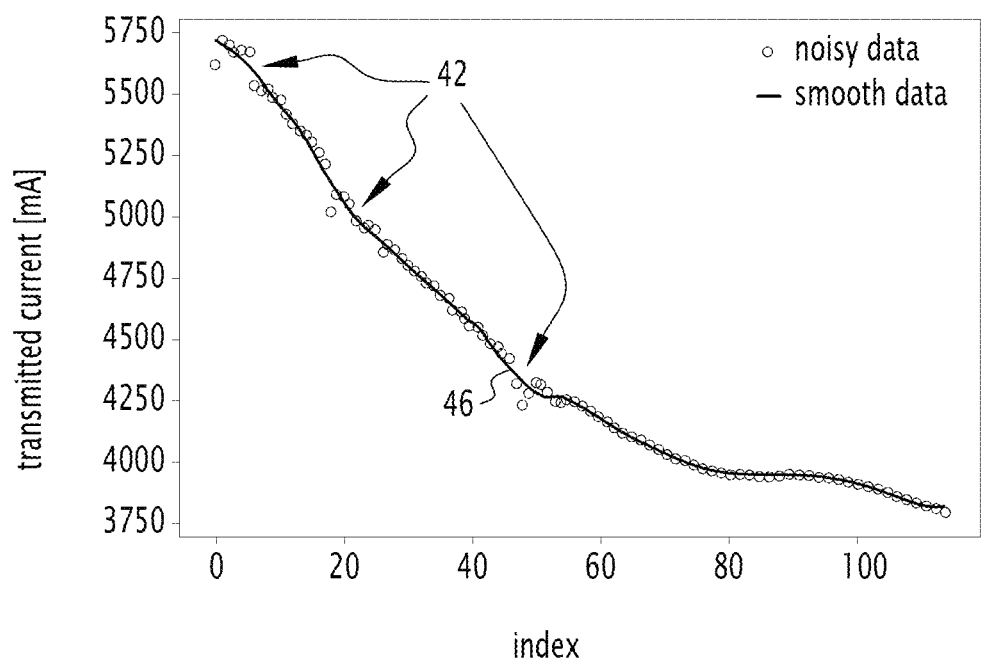
FIG. 7 shows the curve of FIG. 5, which has been smoothed with a Savitzky-Golay filter.

FIG. 7 shows the curve of FIG. 5, which has been smoothed with a Savitzky-Golay filter. The smoothed railway vehicle moving profile is shown with the continuous curve 46.

The circles correspond to the measurement points, which have already be shown in FIG. 5.

The index in the horizontal axis corresponds to the time domain. Each index point represents a specific time at which a measurement of the transmitted time took place.

The Savitzky-Golay Filter (SGF) is a digital filter used to remove outliers and keep signal tendency. It uses the convolution approach by fitting the sub-set of adjacent points in the window of size 2w+1 with the polynomial of degree p. The parameter w is used to specify how many samples will be used for smoothing. It is referred as a window parameter, by specifying how many samples before and after the sample of interest are used for smoothing (2w+1). The parameter p specifies the degree of the polynomial function that is used to approximate the trend of the points in the window. For example if p=1, the linear function is used for smoothing. The higher p values are used to approximate well samples with large variations In practice, curve smoothing using SGF is performed by applying the convolutional coefficients and normalization parameter values on the original dataset. In the example of FIG. 7, a window size set to 5 and a cubic (3) polynomial is used. According to embodiments, the windows size p may be adapted dependent on the respective track circuits.

In another embodiment, a Hodrick—Prescott Filter filter may be used to smooth the railway vehicle moving profile of a railway vehicle 5.

Figure 8:
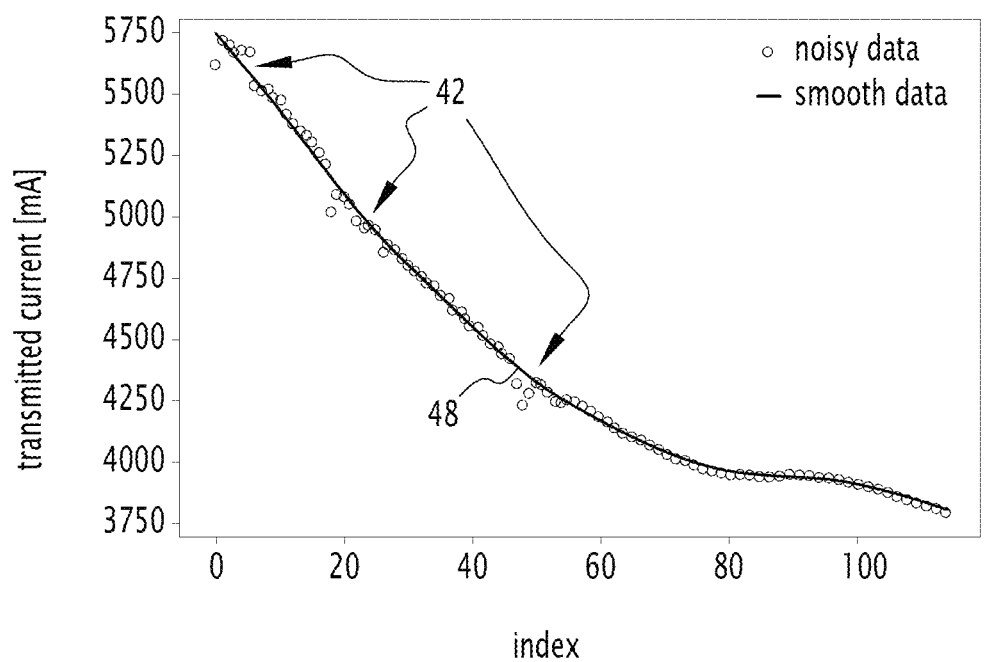
FIG. 8 shows the curve of FIG. 5, which has been smoothed with a Hodrick-Prescott filter.

FIG. 8 shows the curve of FIG. 5, which has been smoothed with a Hodrick-Prescott filter. A Hodrick—Prescott Filter (HPF) method is a digital filter used to remove any cyclical component from the time-series sequence and provide a signal trend.

The smoothed railway vehicle moving profile is shown with the continuous curve 48.

The circles correspond to the measurement points, which have already be shown in FIG. 5.

The index in the horizontal axis corresponds to the time domain. Each index point represents a specific time at which a measurement of the transmitted time took place.

The present invention may use one of the above filters to filter the data provided by the transceiver 6. In other embodiments, no smoothing filter is used or other smoothing filters may be used.

In some embodiments, the same smoothing parameters and smoothing filters are to be used for all the railway vehicle movement profiles. For that purpose, the smoothing parameter and/or the smoothing filter are stored, for example in a memory, in particular the memory of the controller 7.

In the following the second step 32 is explained, in which features are extracted. This step is separated in one or more substeps.

In a first substep, the railway vehicle movement profiles, in particular the smoothed railway vehicle movement profiles are normalized.

In a second substep, the first and second derivatives of the normalized railway vehicle movement profiles and an area between the curves is calculated.

In a third substep, features of interest that will be used in the third step 34 are determined.

In the following the first substep is explained, namely the normalization of the railway vehicle movement profiles of a railway vehicle, in particular the smoothed railway vehicle movement profiles.

According to an embodiment, a z normalization is applied to the railway vehicle movement profiles, in particular the smoothed railway vehicle movement profiles.

It should be noted that also other normalization methods may be used. For example, other normalization methods, which can be used here are mean and min-max normalizations. Using the min-max normalization, all original samples are scaled to [0,1] range.

For that purpose, the (smoothed) railway vehicle movement profile is presented as a sequence of equidistant transmitted current samples in time, $S_k = \langle S_{k1}, S_{k2}, \ldots, S_{kN_k} \rangle$, where $S_{kn}$ present the n-th sample of the k-th railway vehicle, and Nk present the total number of points in the k-th railway vehicle moving along the track. For example, the each sample corresponds to a (smoothed) transmitted current value at an index in FIGS. 6 to 8.

According to an embodiment, the mean $\mu_k$ and standard deviation $\sigma_k$ of the k-th railway vehicle (smoothed) railway vehicle movement profile are calculated. Then, the following equation is used and applied to each sample $S_{kn}$ (with n=1 to Nk)

$$s_{kn}^{(n)} = \frac{s_{kn} - \mu_k}{\sigma_k}, \qquad \text{Equation (2)}$$

where $S_{kn}^{(n)}$ is the normalized value, $\mu_k$ is the mean, $\sigma_k$ is standard deviation, and $S_{kn}$ is the n-th sample of the k-th railway vehicle.

Then, the normalized (smoothed) railway vehicle movement profile is determined with the following formula: $S_k^{(n)} = S_{k1}^{(n)}, S_{k2}^{(n)}, \ldots, S_{kNk}^{(n)}$, with $k_{kn}^{(n)}$ being the normalized value at the n-th sample of the k-th railway vehicle.

It should be noted that the normalization is applied on samples of (smoothed) railway vehicle movement profile of an individual moving railway vehicle. This enables to determine the movement of railway vehicles whose original range might not be the same, for example, different transmitter gain values etc.

In the following, the second substep, namely the calculation of the first and second derivatives of the normalized railway vehicle movement profiles and an area between the curves is described.

In order to describe the shape of a railway vehicle movement profile, presented as the sequence of normalized railway vehicle movement profile values a first and a second derivative are determined. In an example, the first and second derivate are estimated using numerical approaches. However, also other estimation methods may be used.

Figure 9:
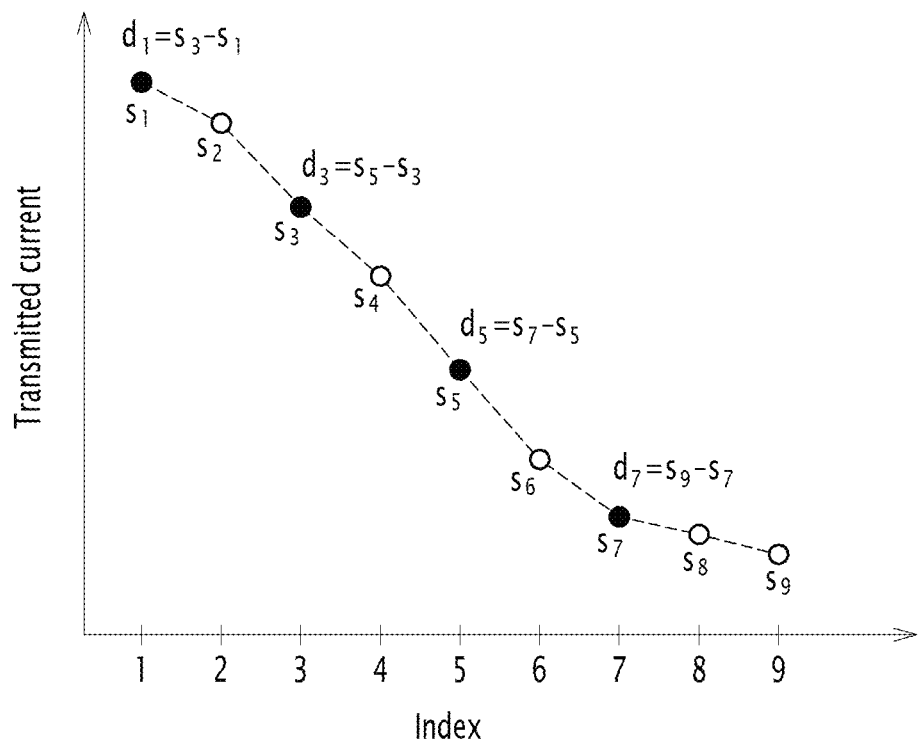
FIG. 9 shows a curve of a calculation of first derivative samples of normalized (smoothed) transmitted current values.

The first derivative, denoted as $d_n$, at the point $S_{kn}^{(n)}$, is calculated as $$d_n = S_{kn+i}^{(n)} - S_{kn}^{(n)} \qquad \text{Equation (3)}$$

where I≥1 presents the distance, in indices, of two sample points $S_{kn+i}^{(n)}$ and $S_{kn}^{(n)}$. For example, the first derivative is calculated every I points, starting with the first sample $S_{k1}^{(n)}$ in the curve of the normalized (smoothed) railway vehicle movement profile. FIG. 9 shows a curve of a calculation of a first derivative samples of normalized (smoothed) movement profile values with I=2. It should be noted that in the embodiment shown the derivative is calculated only for the points presented as filled circles in the figure. In other embodiments, the derivative is calculated for all sample points or index values.

The second derivative $dd_n$ at the point $s_n$ is calculated with the following formula:

$$dd_n = S_{kn+i}^{(n)} - 2S_{kn}^{(n)} + S_{kn}^{(n)} \qquad \text{Equation (4)}$$

where I≥1 presents the distance, in indices, of two sample points $S_{kn+i}^{(n)}$ and $S_{kn}^{(n)}$ from the n-th sample $\delta_{kn}^{(n)}$.

Figure 10:
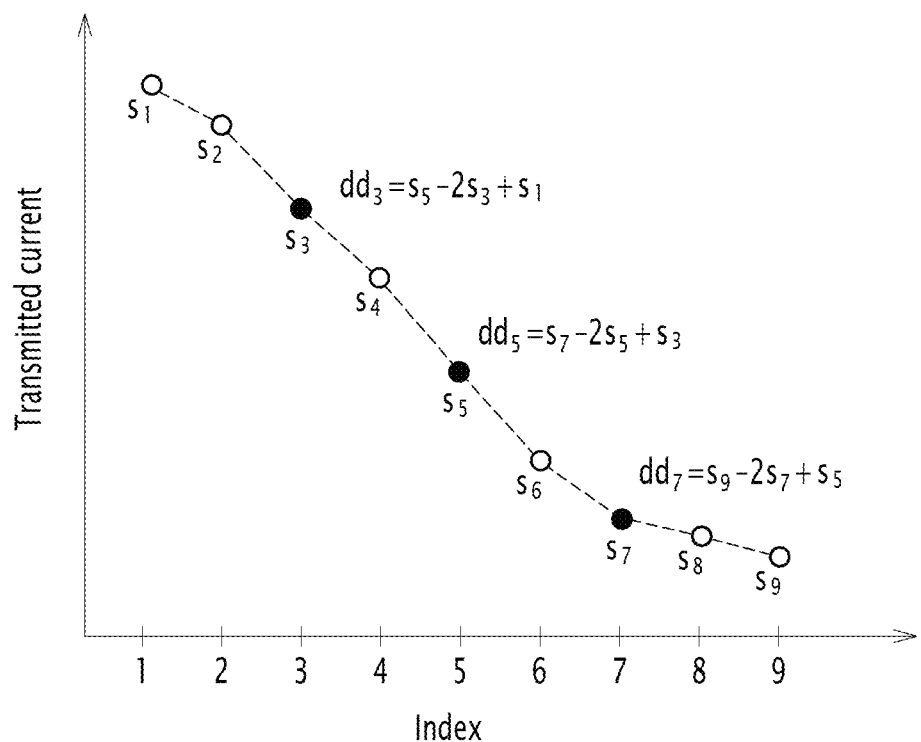
FIG. 10 shows a curve of a calculation of second derivative samples of normalized (smoothed) transmitted current values.

FIG. 10 shows a curve of a calculation of a second derivative samples of normalized (smoothed) railway vehicle movement profile values with I=2. It should be noted that the second derivative is only calculated for the sample points or index values presented as filled circles in the figure.

In other embodiments, the derivative is calculated for all sample points or index values.

Further, in some embodiments the distance I may be different for the first derivative and the second derivative. Preferably, the distance I is the same value for the first and second derivative. Further, the number of points depend on the number of measured values.

It should be noted that in the FIGS. 9 and 10 and the following figures, the upper index (n) used here-above in equation (4) for indicating that the calculation are based on the normalized values and the lower index k used hereabove for indicating the k-th railway vehicle is not shown.

In the following, the area between the normalized (smoothed) railway vehicle movement profile and the line connecting the first and last values of the movement profile, called Area Between Curves (ABC) is determined.

Figure 11:
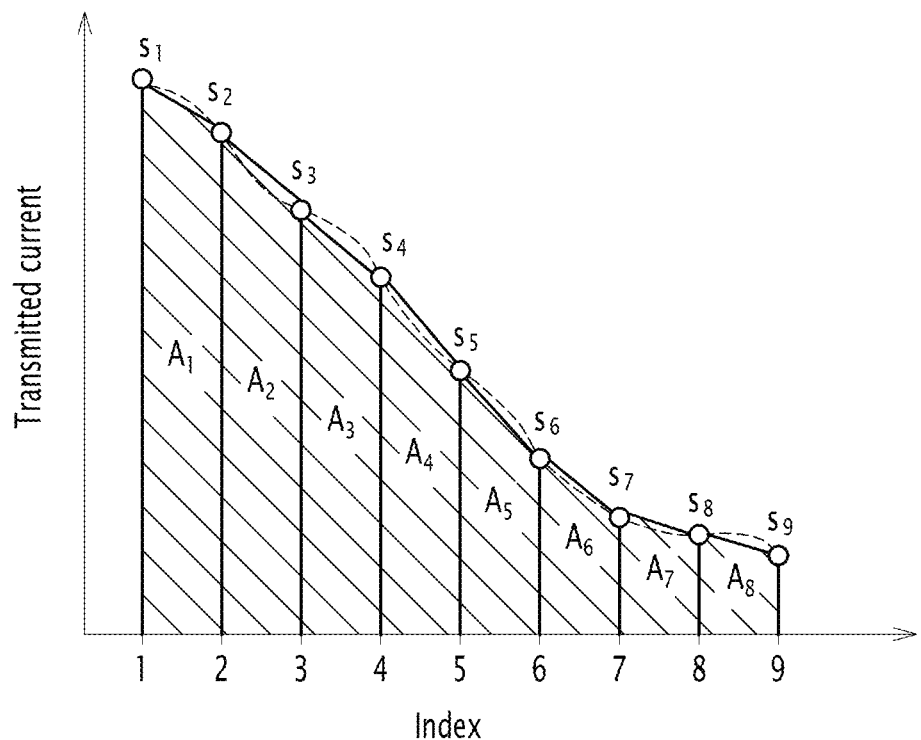
FIG. 11 shows an Area Under Curve (AUC) of the normalized (smoothed) transmitted current values.

To do this, first the area between the x-axis and the normalized (smoothed) railway vehicle movement profile, or Area Under Curve (AUC), see hatched area in FIG. 11 is determined. The AUC is estimated based on the sum of eight trapezoids $A_1, A_2, \ldots A_8$. If the sequence $S_k$ includes more or less points, the number of trapezoids may also vary accordingly.

Figure 12:
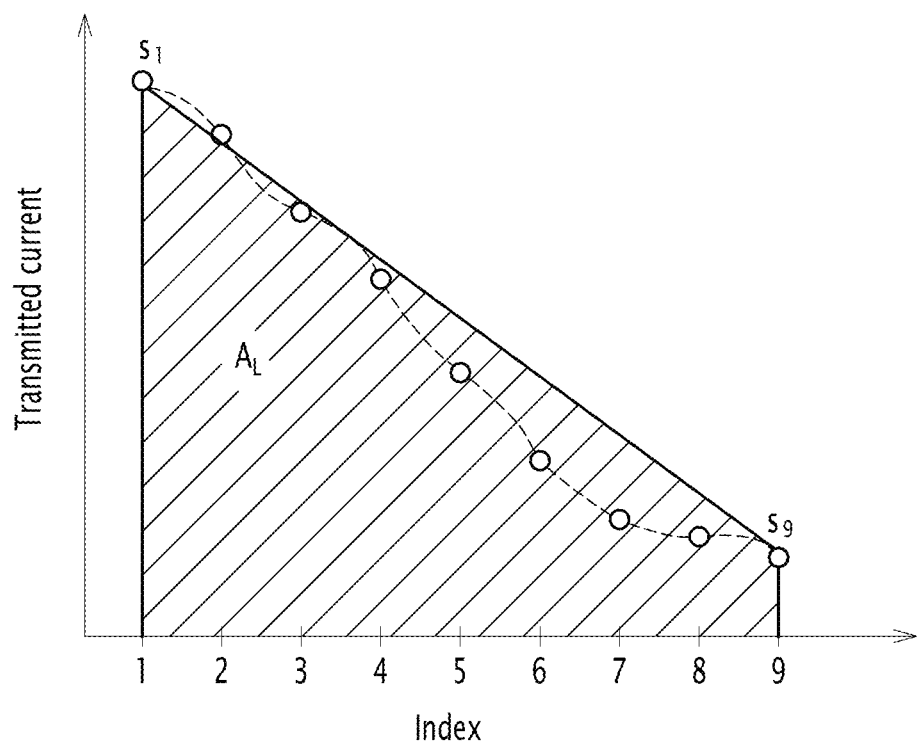
FIG. 12 shows an Area Under Line (AUL) of the normalized (smoothed) transmitted current values.

FIG. 12 shows an Area Under Line (AUL) $A_L$ of the normalized (smoothed) railway vehicle movement profile, which is defined by the area under a line defined by the first and the last sample or index value, here $s_1$ and $s_9$. The Area Under Line is the hatched are in FIG. 12.

Figure 13:
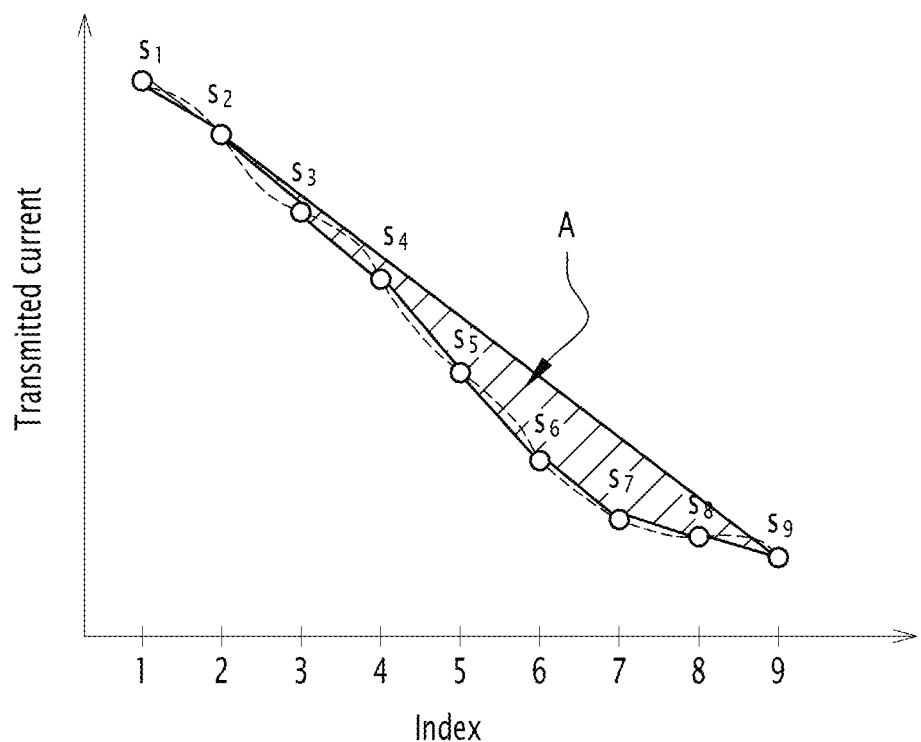
FIG. 13 shows an Area Between Curves (ABC) of the normalized (smoothed) transmitted current values.

FIG. 13 shows an Area Between Curves (ABC) A of the normalized (smoothed) railway vehicle movement profile, which is the difference between the AUL and the AUC. The ABC is shown as hatched area in FIG. 13.

In alternative embodiments, the ABC value may be also determined using other methods. For example, the calculated derivatives may be used or a numerical integration method may be used.

In the following the third substep will be explained.

In the following substep, the one or more features are extracted based on the first derivative, second derivatives and/or the ABC determination. For example, one or more of the following features are extracted:

Minimum of the first derivative,
Maximum of the first derivative,
Minimum of the second derivative,
Maximum of the second derivative,
Range of the first derivative,
Range of the second derivative,
Median of the first derivative,
Median of the second derivative,
Mean of the first derivative,
Mean of the second derivative,
Standard deviation of the first derivative,
Standard deviation of the first derivative,
Percentage of the first derivative being negative,
Percentage of the second derivative being negative, and/or
ABC surface value.

In an embodiment, the above smoothing and feature extraction steps are performed in the same manner for reference, in particular simulated, railway vehicle movement profiles and real measured railway vehicle movement profile as it can be seen on the left and the right side of the flow chart of FIG. 4.

In the following, the third step 34 of the classification of the (smoothed) railway vehicle moving profiles is explained with respect to FIGS. 14 to 19A.

This is first performed with simulated railway vehicle movement profiles in order to generate a model of the best representations of different railway vehicle moving profiles.

According to embodiments, a modified k means clustering method is performed. A k-means clustering method is a vector quantization that aims to partition n observations into k clusters in which each observation belongs to a cluster with the closest mean. The closest mean is also centroid and serves as a prototype for that cluster. The k means clustering method is based on the railway vehicle movement profile movement profiles.

As discussed above, it is distinguished between a training and a testing phase of the k-means clustering method. As it has been explained, during the training phase, an input dataset is used, that is generated through simulations. In other cases, other reference railway vehicle movement profiles may be used.

Artificially simulated railway vehicle movement profiles have different but known profiles such as accelerating, decelerating, and constant speed. At the end of this phase, as it will be explained in the following, the most representative values for each railway vehicle movement profile type, called centroids are determined. These centroids are used as a model or set of thresholds in order to classify each real railway vehicle movement profile as they occur, for example accelerating, decelerating or constant speed, based on their distance from the centroids. According to embodiments, models for various track lengths are created.

For example, a reference curve is generated, which establishes a relationship between the distance and the measured transmitted current. FIG. 14 shows again a reference curve (the solid line 50) including the respective points where a shunt is positioned (see circles). As a reference a diagonal linear dashed line is shown connecting the endpoints of the reference curve 50.

In a next step, several different railway vehicle movement profiles are created. Each profile may be different from the other profiles. The railway vehicle movement profiles may include decelerating railway vehicles, railway vehicles with constant speed, and railway vehicles, which are accelerating. For each of the railway vehicle movement profiles, it is assumed that the speed, acceleration, if applicable, and related location can be found. Then, using the speed profiles and the reference curve determined above, a simulated or reference railway vehicle movement profile is determined showing the transmitted current with respect to the time. The data may be stored as a sequence of simulated measurement values.

Figure 15:
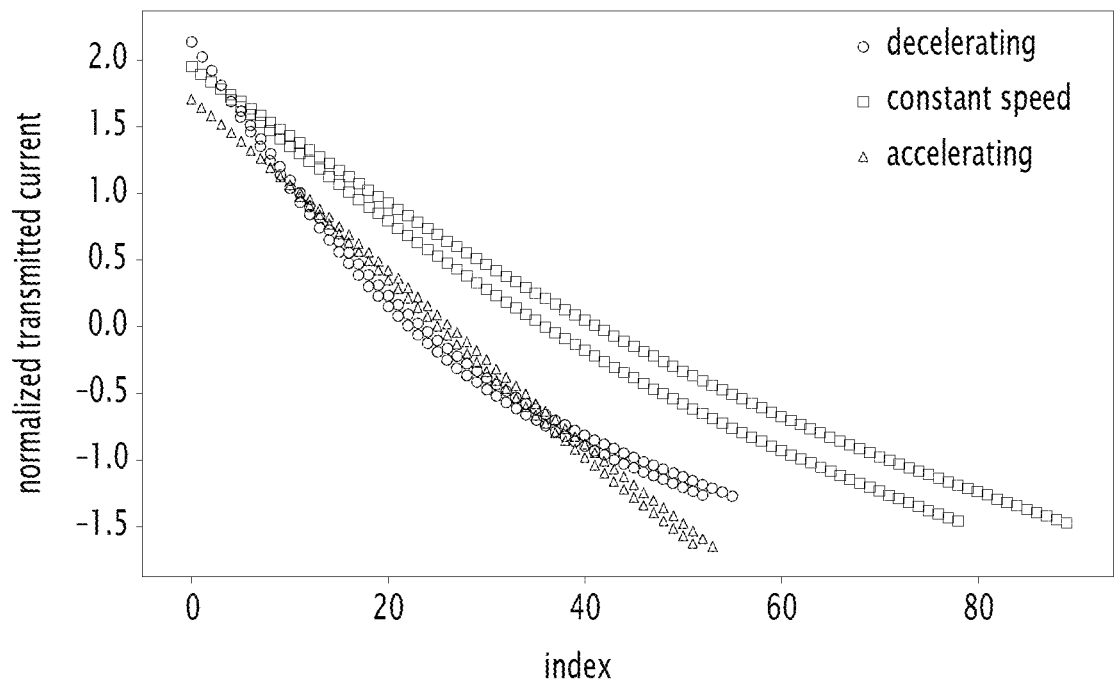
FIG. 15 shows sequences of normalized (smoothed) measured transmitted currents for different simulated railway vehicles moving over the track.

FIG. 15, shows sequences of normalized (smoothed) railway vehicle movement profiles for different simulated railway vehicles moving over the railway track, the decelerating railway vehicles are shown with a circle, the railway vehicles moving with a constant speed are shown with a square and the accelerating simulated railway vehicles are shown with a triangle. In an embodiment, the normalization may be performed as discussed above using a z-normalization. Further, prior to the normalization, the simulated or reference railway vehicle movement profiles may have been smoothed.

Figure 16:
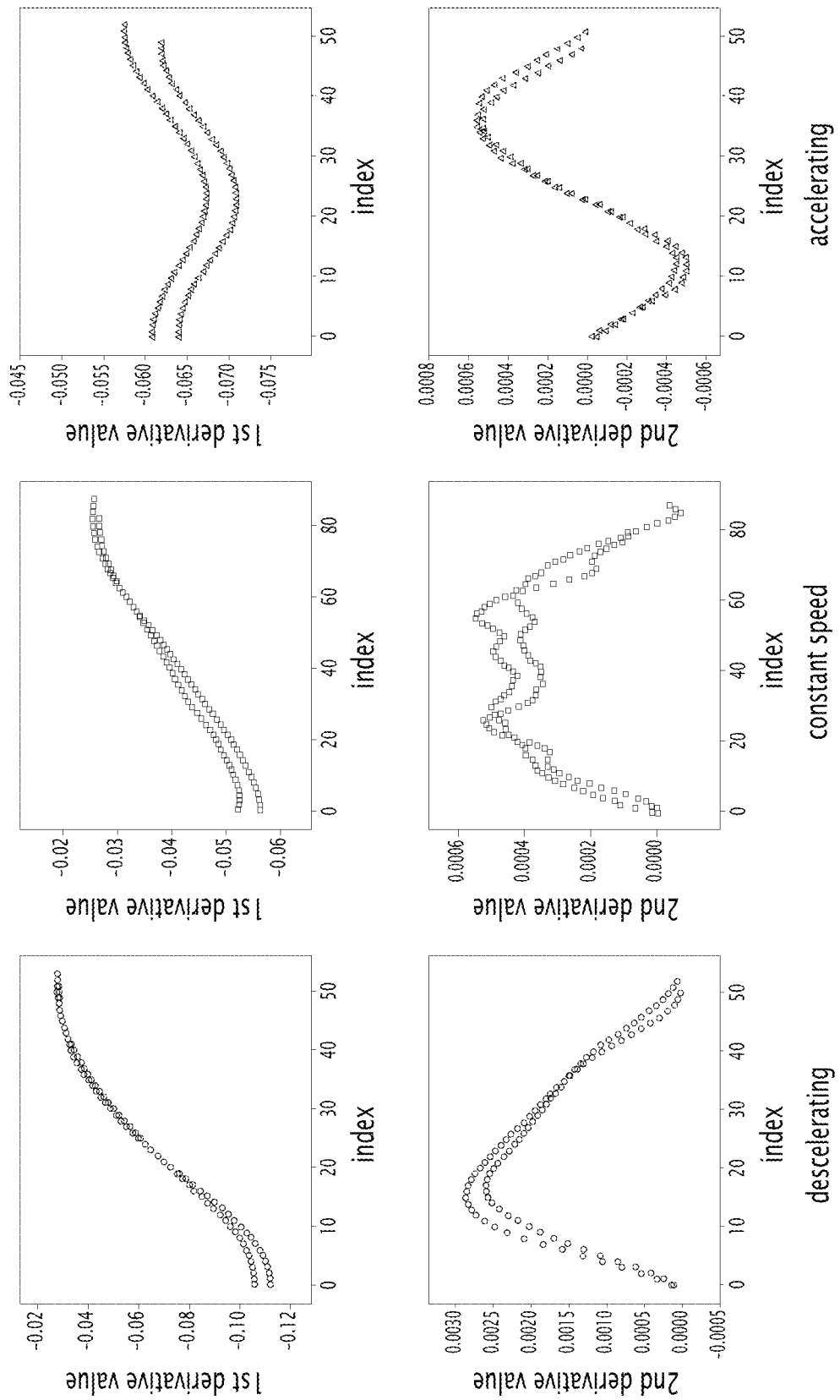
FIG. 16 shows the first derivatives and the second derivatives of the normalized smoothed measured transmitted currents of FIG. 15.

FIG. 16 shows the first derivatives and the second derivatives of the normalized smoothed railway vehicle movement profiles of FIG. 15. The first row of graphs shows the first derivative and the second row of graphs show the second derivative. Further, also the Area Between Curves (ABC) values are calculated. The first column shows data for railway vehicle movement profiles which are decelerating. The second column shows data for railway vehicle movement profiles which are constant speed. The third column shows data for railway vehicle movement profiles which are accelerating.

The result of one or more of these calculations is used for the classification.

This simulated dataset is used for training to generate the k-means centroids, which will be used later for the classification of real railway vehicle movement profiles as either accelerating, decelerating or constant speed. In general, many simulated railway vehicle movement profiles are created, for example between 15 and 50, in particular 20, per a given railway vehicle movement profile type (accelerating, decelerating, constant speed). However, for clarity purposes, only 2 different simulations per railway vehicle movement profile type are used in the present examples.

In a first step, the k-means centroids are calculated with respect to a given railway vehicle movement profile type using the following formula:

$$\mu_c = \frac{1}{N_c}\sum_{n=1}^{N} t_{n \to train\ type} x_{n1},$$

Equation (5)

Where $X_n$ is a vector of railway vehicle movement profile features, $t_{n \to}$ train type presents the simulated railway vehicle movement profile association based on its railway vehicle movement profile type (such as accelerating, decelerating, or constant speed), $N_c$ is the number of train moves within a railway vehicle movement profile type.

In an embodiment, the vector $X_n$ may include selected features as a vector, for example the ABC value, the first derivative range and the second derivative negative percentage. In other embodiments one or more other features may be selected, in particular from the list of possible features shown above. For each railway vehicle movement profile, a single vector is created including the selected features.

$t_{n \to}$ train type is selected of the values 0 or 1. For example, if the centroids for the accelerating railway vehicle movement profiles are created, the value is 1 for the accelerating movement profiles and 0 for the other movement profiles (decelerating or constant speed). In other words, this variable is used to select the correct vector of features for the calculation of the centroids.

In the following, some of the features extracted are clustered using the k-means method. For example, in an embodiment, the ABC value, the first derivative range and the second derivative negative percentage are used as features. The first derivative range is calculated as the difference between the first and the last derivative values. The second derivative negative percentage is calculated as the percentage of time during the sequence of values is negative. In other embodiments, other features may be taken. In the following, the centroids of a pair of the above selected features (ABC value, first derivative range, and second derivative negative percentage) are shown with the respective centroids. The centroids can be designated with $\mu_c$ and are shown as a star in the following figures.

Figure 17:
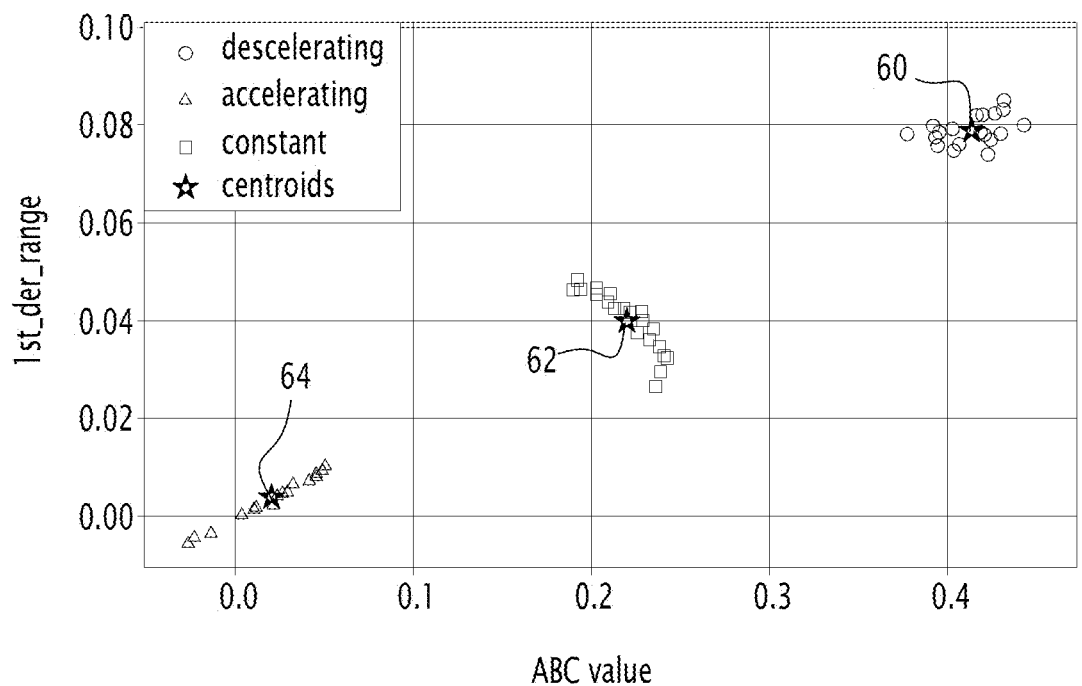
FIG. 17 shows the first derivative range with respect to the ABC value.

FIG. 17, shows the first derivative range with respect to the ABC value. The decelerating railway vehicles are shown with a circle, the railway vehicles moving with a constant speed are shown with a square, the accelerating simulated railway vehicles are shown with a triangle, and the respective three centroids are shown as stars 60, 62, 64.

Figure 18:
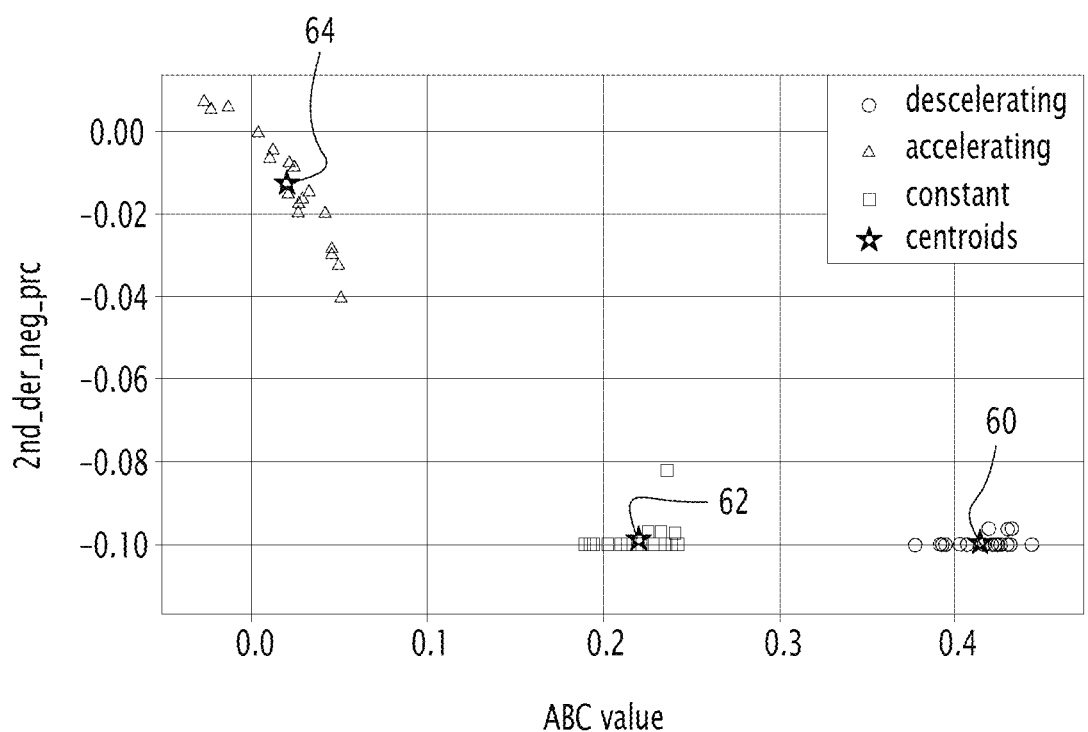
FIG. 18 shows the second derivative negative percentage with respect to the ABC value.

FIG. 18 shows the second derivative negative percentage with respect to the ABC value. The decelerating railway vehicles are shown with a circle, the railway vehicles moving with a constant speed are shown with a square, the accelerating simulated railway vehicles are shown with a triangle, and the respective three centroids are shown as stars 60, 62, 64.

Figure 19:
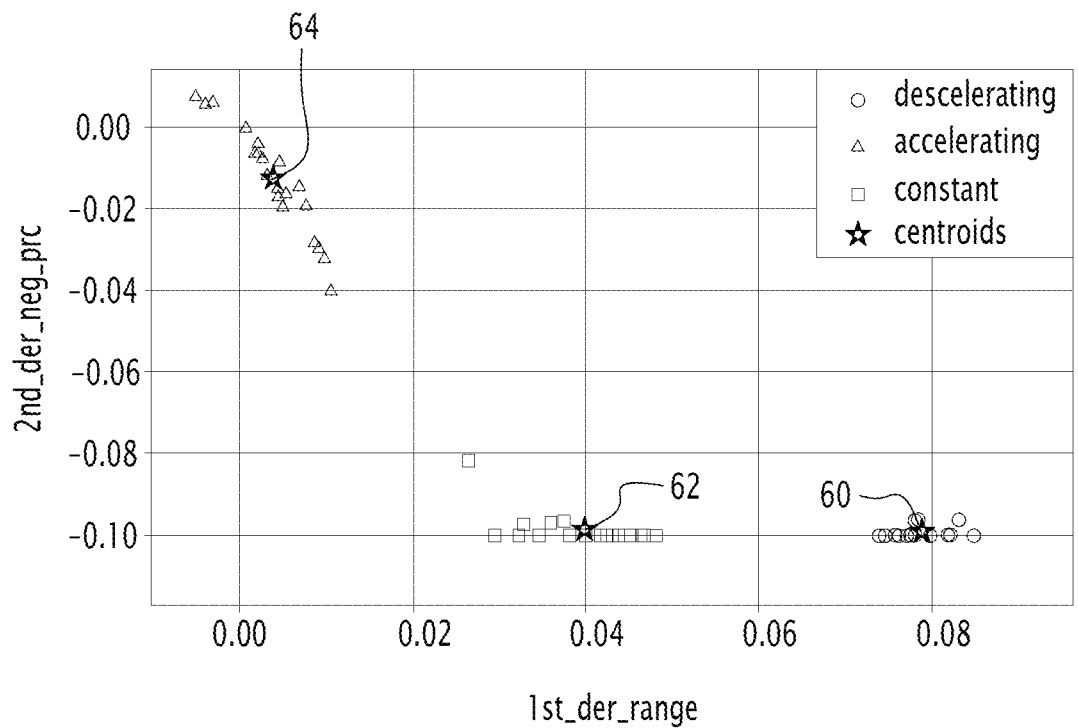
FIG. 19 shows the first derivative range with respect to the second derivative negative percentage.

FIG. 19 shows the first derivative range with respect to the second derivative negative percentage. The decelerating railway vehicles are shown with a circle, the railway vehicles moving with a constant speed are shown with a square, the accelerating simulated railway vehicles are shown with a triangle, and the respective three centroids are shown as stars 60, 62, 64.

Figure 19A:
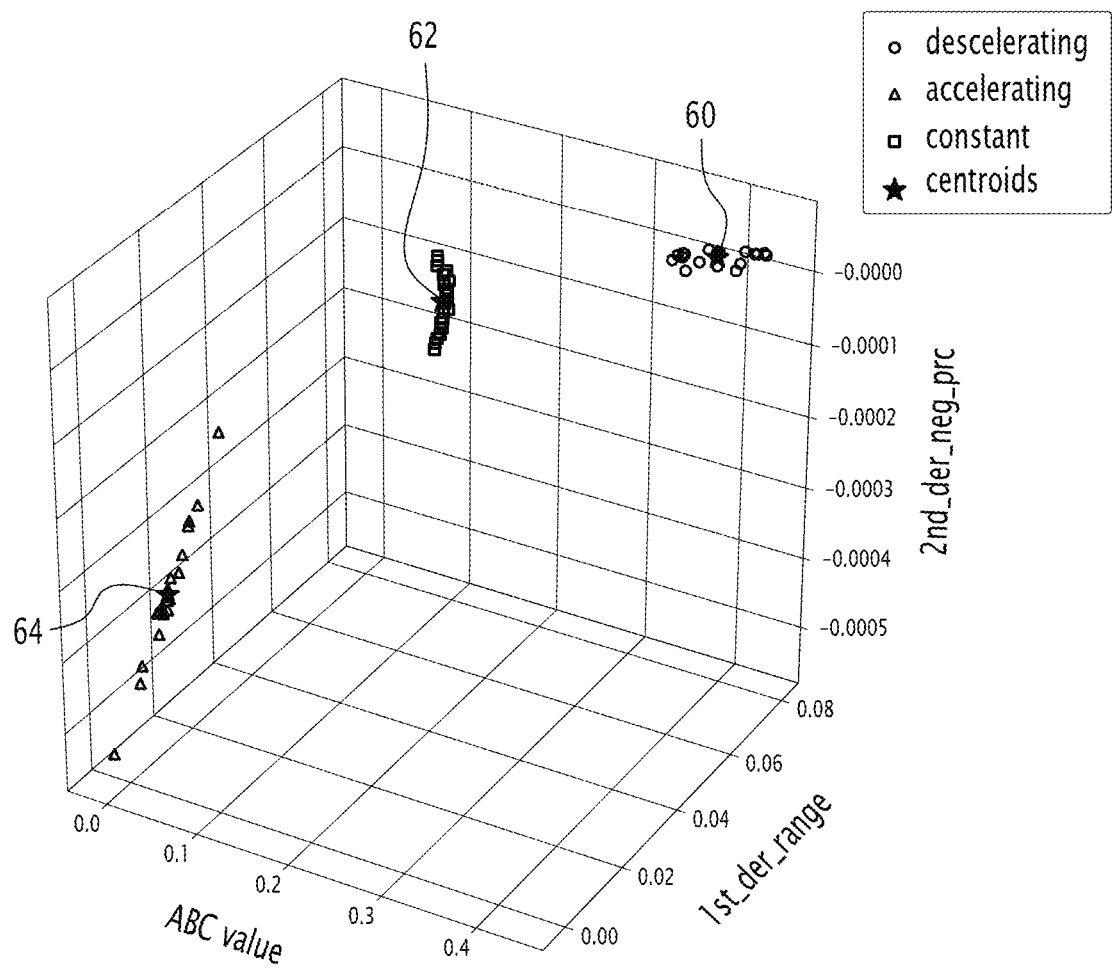
FIG. 19A shows a three dimensional plot of the train movement profile feature and the respective centroids.

FIG. 19A shows a three dimensional plot of the railway vehicle movement profile feature and the respective centroids. The decelerating railway vehicles are shown with a circle, the railway vehicles moving with a constant speed are shown with a square, the accelerating simulated railway vehicles are shown with a triangle, and the respective three centroids are shown as stars 60, 62, 64.

The centroid 60 relates to the centroid of the railway vehicle movement profile type of decelerating railway vehicles, the centroid 62 relates to the centroid of the railway vehicle movement profile type of railway vehicles with constant speeds, and the centroid 64 relates to the centroid of the railway vehicle movement profile type of accelerating railway vehicles.

When the training as been finished, the real railway vehicle data of measured transmitted currents may be used in order to be classified using the results from the k-means classifying training phase described above. The same preparation steps are used, for example smoothing, normalizing and feature extraction as described above.

According to embodiments, the same features are extracted for the real railway vehicle movement profiles as for the training.

Then the distance, in particular the Euclidean distance between the extracted feature of the railway vehicle movement profile as a vector $x_r$ and the centroids $\mu_c$, where c can designate a constant speed, decelerating or accelerating railway vehicle.

In an embodiment, the vector $x_r$ may include the selected features as a vector, for example the ABC value, the first derivative range and the second derivative negative percentage.

It should be noted, that the c depend on the number of different railway vehicle movement profile types, with which the k-means classifying method has been trained. In other words, that this is not limited to the above three railway vehicle movement profile types. The railway vehicle is assigned to the closest centroid in terms of the calculated (Euclidian) distance. Formally, the classification is determined as $$c_r^* = \underset{c}{\operatorname{argmin}} \|x_r - \mu_c\|_2, \quad \text{Equation (6)}$$

where $C^*_r$ represents the railway vehicle movement profile type (for example: constant speed, decelerating railway vehicle or accelerating railway vehicle) with the centroid located closest in term of Euclidean distance.

Figure 20:
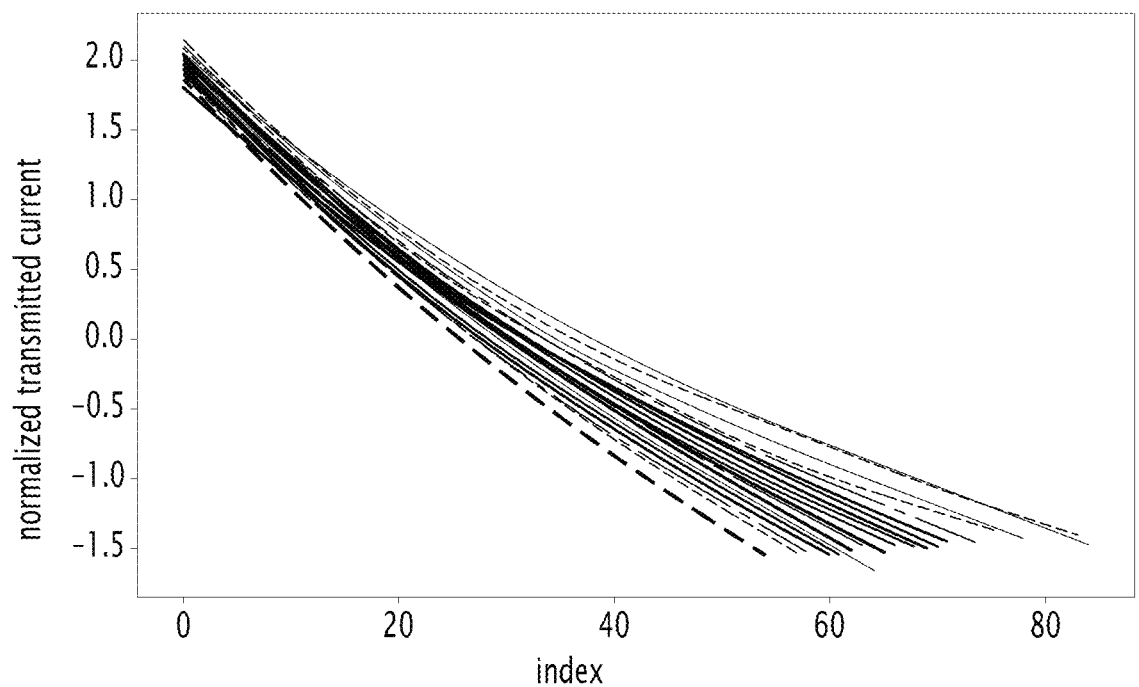
FIG. 20 shows a plurality of measured transmitted currents, which are smoothed and normalized.

In order to illustrate the classification process, FIG. 20 shows a collection of real railway vehicle movement profiles, which are smoothed and normalized, in particular with respect to an index corresponding to the time samples.

For each of the measurement series for a specific railway vehicle, the same set of features as for the determination of the centroids is determined for example in form of the vector $x_r$. In an example, the vector $x_r$ or the set of features include the ABC value, the first derivative range, and the second derivative negative percentage. In other embodiments, other features may be selected and/or the number of features may be different.

As detailed above, in particular with respect to equation 6, the classification of the measured series for each real railway vehicle move is based on the minimal distance between its feature vector $x_r$ and k-means centroids.

In FIGS. 21, 22, 23 and 23A showing the respective features with respect to each other, the railway vehicles determined as decelerating are shown with a circle, the railway vehicles determined as moving with a constant speed are shown with a square, the railway vehicles determined as accelerating are shown with a triangle, and the respective three centroids are shown as stars. The centroids are shown in the same positions as in FIGS. 17, 18, 19 and 19A. The centroid 60 relates to the centroid of the movement profile type of decelerating railway vehicles, the centroid 62 relates to the centroid of the movement profile type of railway vehicles with constant speeds, and the centroid 64 relates to the centroid of the movement profile type of accelerating railway vehicles.

Figure 21:
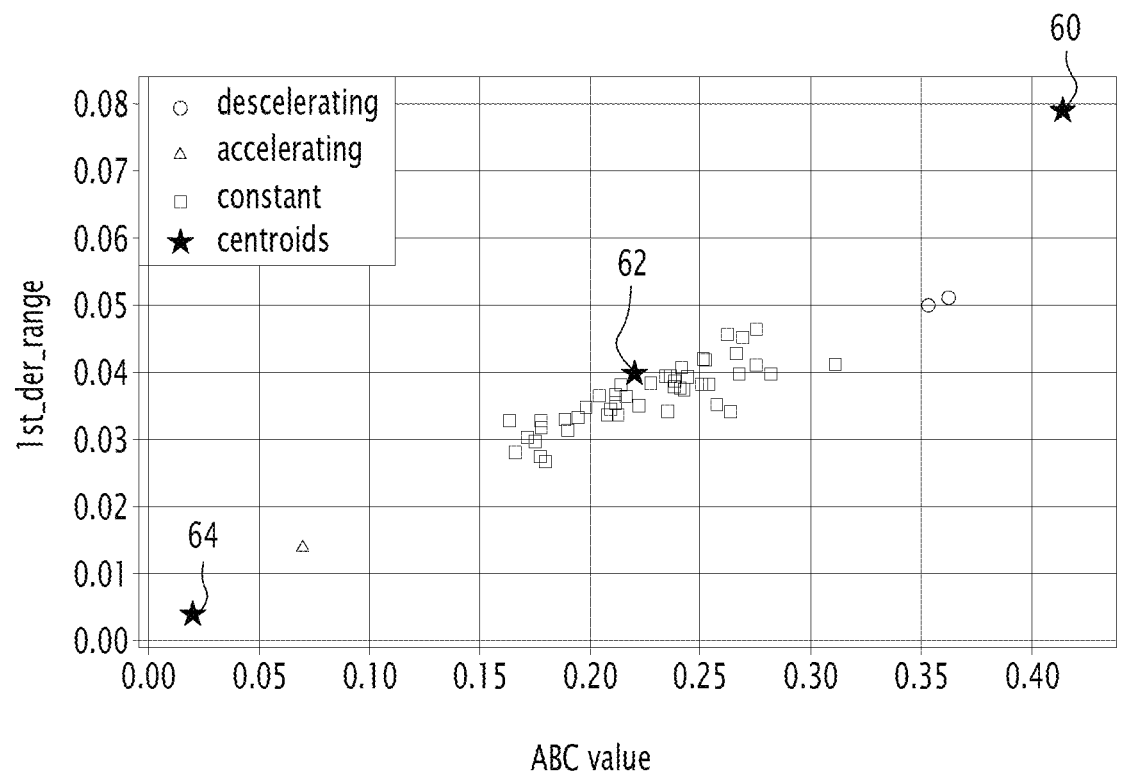
FIG. 21 shows the first derivative range with respect to the ABC value.
Figure 22:
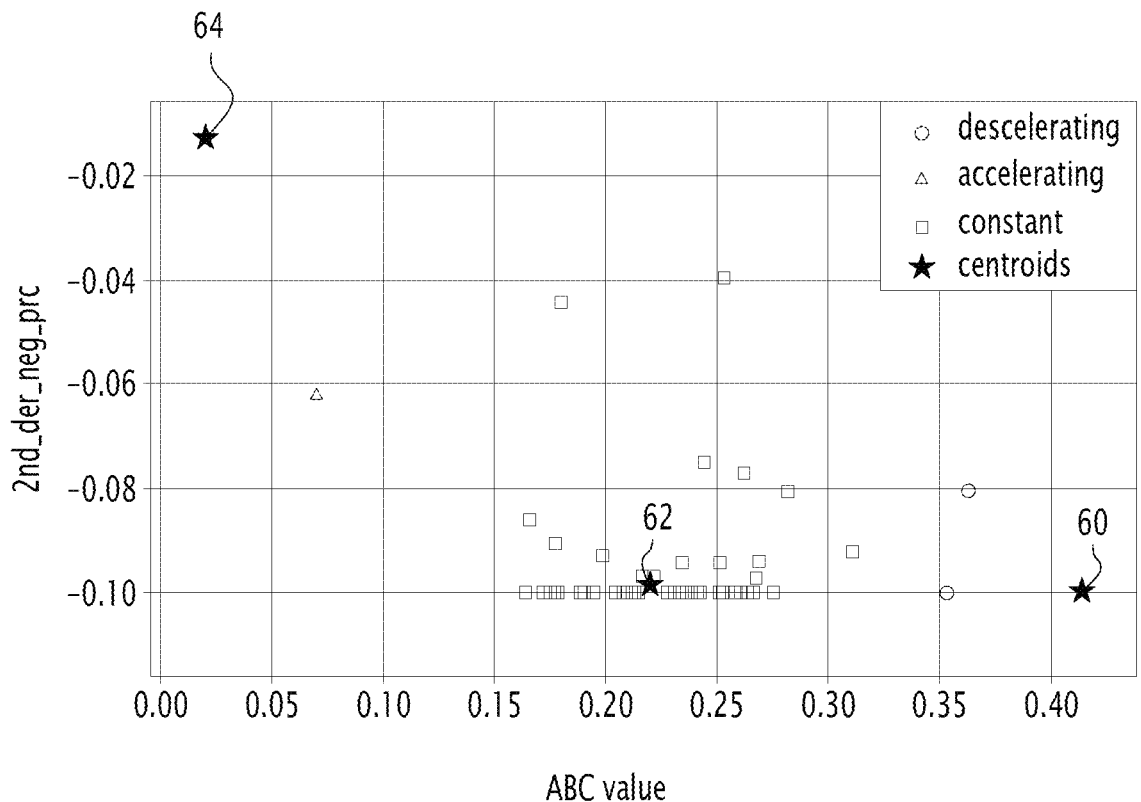
FIG. 22 shows the second derivative negative percentage with respect to the ABC value.
Figure 23:
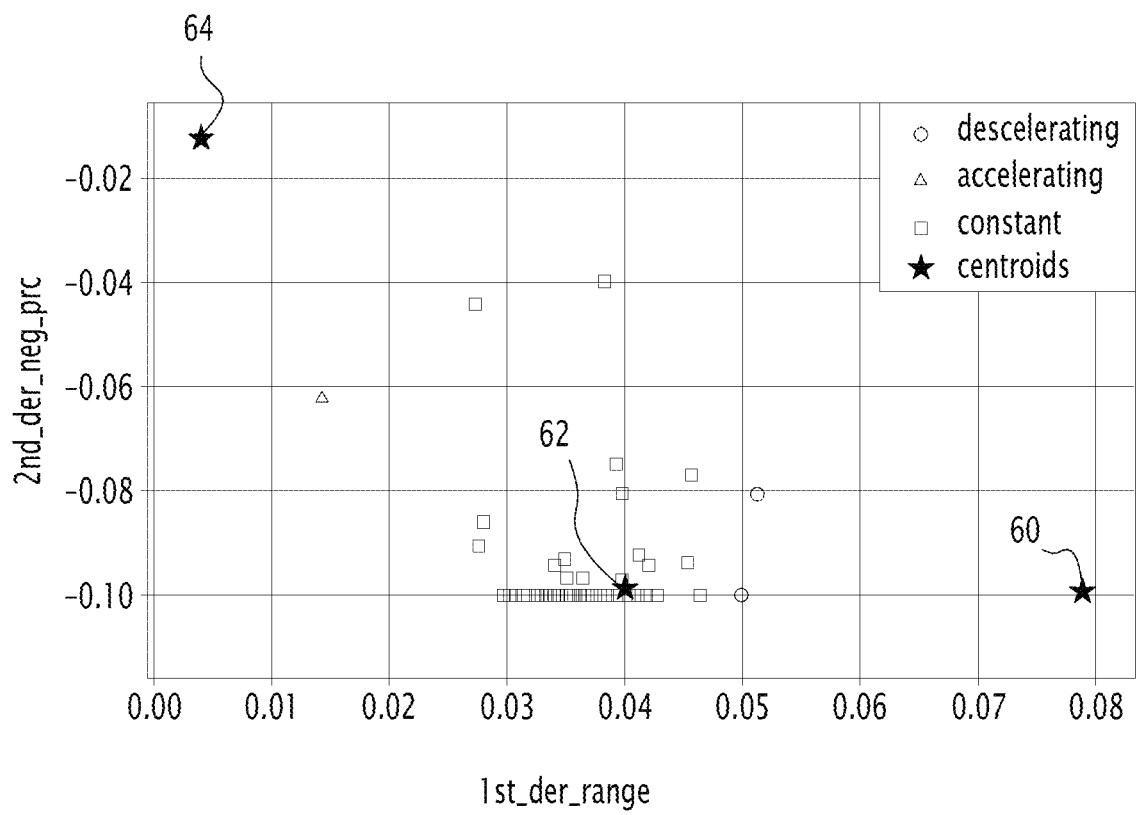
FIG. 23 shows the first derivative range with respect to the second derivative negative percentage.
Figure 23A:
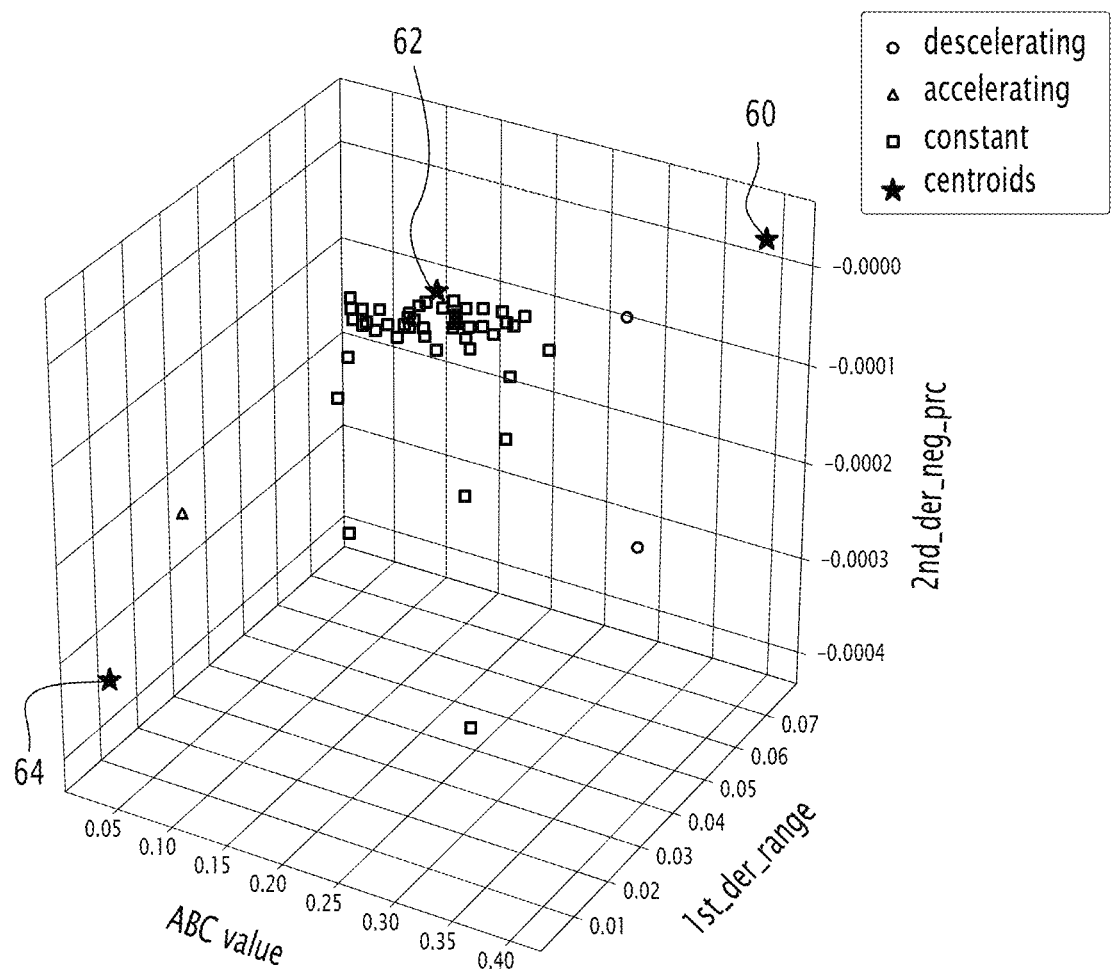
FIG. 23A shows a three dimensional plot of the train movement profile feature and the respective centroids.

FIG. 21 shows the first derivative range with respect to the ABC value. FIG. 22 shows the second derivative negative percentage with respect to the ABC value. FIG. 23 shows the first derivative range with respect to the second derivative negative percentage, and FIG. 23A a three dimensional representation.

Figure 24:
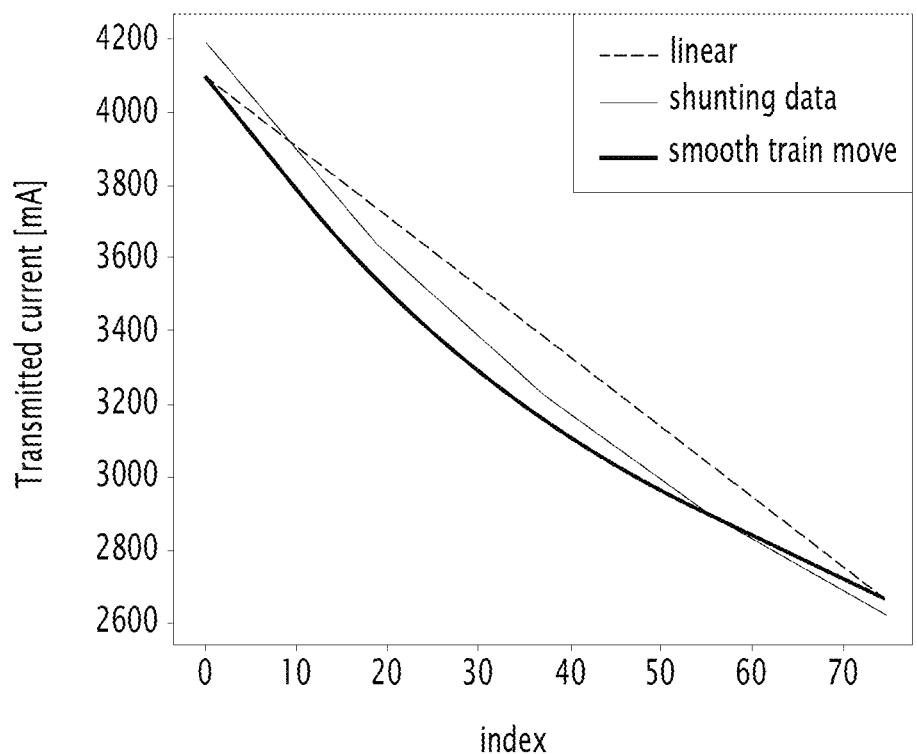
FIGS. 24, 25 and 26 show respectively the normalized transmitted current with respect to the time, of a railway vehicle classified as decelerating (FIG. 24), classified as driving with constant speed (FIG. 25) and classified as accelerating (FIG. 26)
Figure 25:
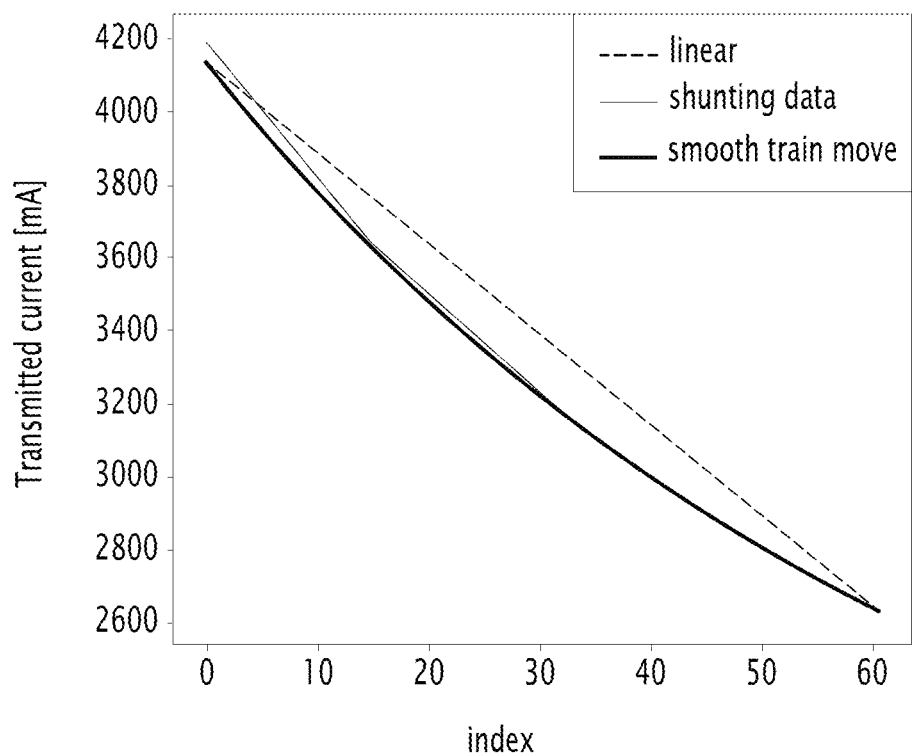
Figure 26:
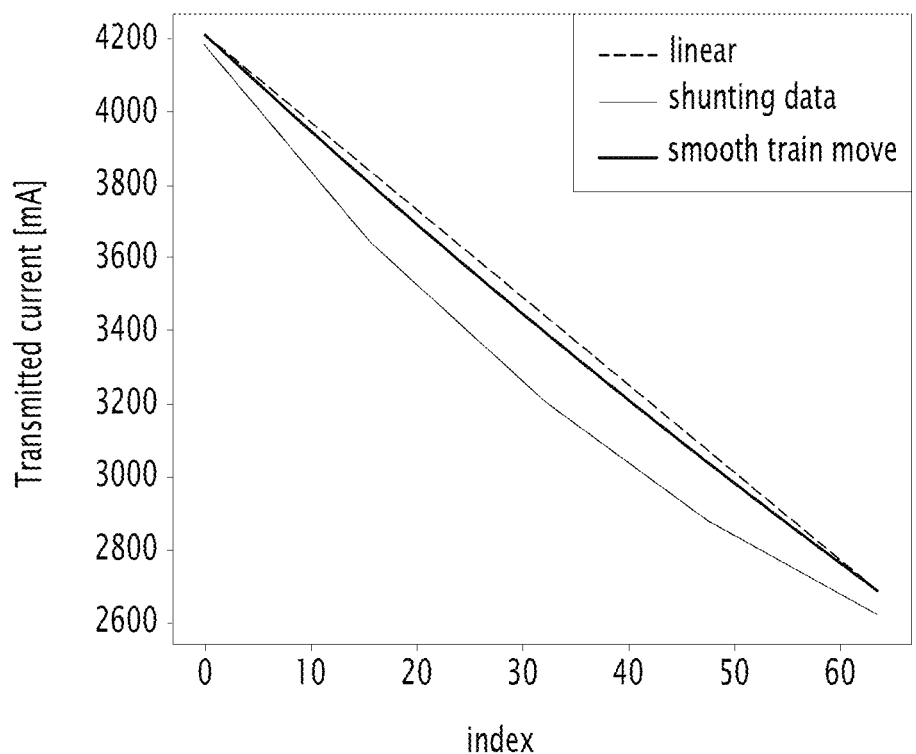

FIGS. 24, 25 and 26 show respectively the normalized movement profile with respect to the index, of a railway vehicle classified as decelerating (FIG. 24), classified as constant speed (FIG. 25) and classified as accelerating (FIG. 26). As a comparison, the shunting data is shown, which corresponds to the reference curve in FIG. 14.

This invention provides a method by which data from passing railway vehicles collected as transmitted current versus time are analysed to determine if a train was accelerating, decelerating, or had relatively constant speed.

The localization or determination of a distance of the railway vehicle 5 with respect to feed in points 9 can be improved based on the classification.

Further, the dynamic time warp process for the calibration may also be improved, by eliminating those railway vehicles, which are accelerating or decelerating.

The present disclosure can be used to overcome the limitation of the DTW process to avoid location errors due to railway vehicle acceleration or deceleration. This will allow a more accurate location and enable railroads to use track circuits to provide real time railway vehicle location with much better resolution.

Figure 27:
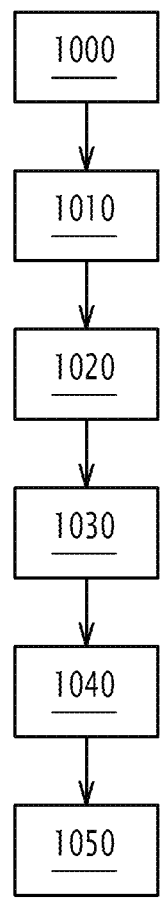
FIG. 27 shows a flow chart of a method according to an embodiment.

FIG. 27 shows a flow chart of a method according to an embodiment. For example, the method may be implemented in the controller 7 of a track circuit system 1 shown in FIG. 1.

In a first step 1000, the controller obtains a railway vehicle movement profile. For example, the controller may store a plurality of measured transmitted currents measured by the transceiver 6. The plurality of measured transmitted currents are aligned in a sequence with respect to time to obtain the railway vehicle movement profile, in particular when a railway vehicle has moved along the railway track including the rails 3. In step 1010, the railway vehicle movement profile is filtered in order to smooth the railway vehicle movement profile. For example, as detailed above an exponential filter, a Savitzky-Golay filter or a Hodrick-Prescott Filter may be used for that purpose. Other suitable filters may be also used, in order to remove noise in the data.

In step 1020, the railway vehicle movement profile is normalized. For example, a z normalization may be used for that purpose as explained above.

In step 1030 one or more features from the normalized railway vehicle movement profile are extracted. For example, for that purpose one or more derivatives of the normalized railway vehicle movement profile may be calculated.

In step 1040, the distance of the extracted features with respect to each centroid of a railway vehicle movement profile type determined in a classification process is calculated. In case the railway vehicle movement profile type includes three types, namely an accelerating railway vehicle, a railway vehicle at constant speed, and a decelerating railway vehicle, each railway vehicle movement profile type has a centroid, so that three distances are calculated.

In step 1050, the railway vehicle movement profile to the railway vehicle movement profile type with the closest centroid is assigned. Thus, it is possible to obtain the railway vehicle movement profile type of a measured railway vehicle movement profile, which may be further used by other methods, for example for calibrating track circuit system 1 or for determining the positon of a railway vehicle on the track.

The present invention may also relate to the following embodiments:

According to one aspect, a computer implemented method for determining railway vehicle movement profile type of a railway vehicle movement profile is provided, wherein the railway vehicle movement profile comprises a sequence of measured transmitted currents of a transceiver of a track circuit with respect to the time, comprising
  obtaining a railway vehicle movement profile;
  normalizing the railway vehicle movement profile;
  extracting one or more features from the normalized railway vehicle movement profile;
  determining the distance of the extracted features with respect to each centroid of a railway vehicle movement profile type determined in a classification process; and
  assigning the railway vehicle movement profile to the railway vehicle movement profile type with the closest centroid.

Further embodiments may relate to one or more of the following features, which may be combined in any technical feasible combination:
  the extracted features are one or more of the group selected of: Minimum of the first derivative, Maximum of the first derivative, Minimum of the second derivative, Maximum of the second derivative, Range of the first derivative, Range of the second derivative, Median of the first derivative, Median of the second derivative, Mean of the first derivative, Mean of the second derivative, Standard deviation of the first derivative, Standard deviation of the first derivative, Percentage of the first derivative being negative, Percentage of the second derivative being negative, and/or ABC surface value, wherein the features are calculated from the normalized railway vehicle movement profile;
  prior to normalizing step, the railway vehicle movement profile is smoothed;
  the smoothing is performed using one or more filters selected of the group of an exponential filter, a Savitzky-Golay filter and a Hodrick-Prescott Filter;
  the extracted features are one or more of the group selected of: Minimum of the first derivative, Maximum of the first derivative, Minimum of the second derivative, Maximum of the second derivative, Range of the first derivative, Range of the second derivative, Median of the first derivative, Median of the second derivative, Mean of the first derivative, Mean of the second derivative, Standard deviation of the first derivative, Standard deviation of the first derivative, Percentage of the first derivative being negative, Percentage of the second derivative being negative, and/or ABC surface value, wherein the features are calculated from the normalized smoothed railway vehicle movement profile;
  the classification process for determining the centroids comprises:
    obtaining a plurality of reference railway vehicle movement profiles for each railway vehicle movement profile type, wherein for each reference railway vehicle movement profile the railway vehicle profile type is known;
    normalizing each of the reference railway vehicle movement profiles; and
    extracting one or more features for each of the normalized reference railway vehicle movement profile;
    determining for each railway vehicle movement profile type the centroid of the extracted features.
  the plurality of railway vehicle movement profiles comprise an accelerating railway vehicle, a railway vehicle with a constant speed and a decelerating railway vehicle;
  obtaining a plurality of reference railway vehicle movement profiles for each railway vehicle movement profile type includes simulating the respective railway vehicle movement profiles based on the characteristics of the track on which the railway vehicles moves;
  the characteristics of the track include the lengths and the rail resistance;
  the extracted features of the normalized reference railway vehicle movement profiles are one or more of the group selected of: Minimum of the first derivative, Maximum of the first derivative, Minimum of the second derivative, Maximum of the second derivative, Range of the first derivative, Range of the second derivative, Median of the first derivative, Median of the second derivative, Mean of the first derivative, Mean of the second derivative, Standard deviation of the first derivative, Standard deviation of the first derivative, Percentage of the first derivative being negative, Percentage of the second derivative being negative, and/or ABC surface value;

According to another aspect, a method for calibrating a track circuit system is provided, wherein the track circuit system includes a transceiver being connected to a pair of rails of a railway track and a controller receiving from the transceiver measured transmitted currents of a track circuit, the method comprising:
  retrieving, by the controller, a plurality of railway vehicle movement profiles based respectively on a sequence of measured transmitted currents of the track circuit with respect to the time;
  for each of the railway movement profiles, determining the railway vehicle movement profile type according to a method disclosed herein;
  retaining railway vehicle movement profiles of railway vehicles with a constant speed; and
  calibrating, by the controller, the track circuit system based on the retained movement profiles.

Further embodiments may relate to one or more of the following features, which may be combined in any technical feasible combination:
  the calibrating of the track circuit system uses a dynamic time warping process to estimate the transmitted current with respect to the railway vehicle location relationship.

According to another aspect, a method for determining the position of a railway vehicle using a track circuit is provided, wherein the track circuit system includes a transceiver being connected to a pair of rails of a railway track at a feed in point and a controller receiving from the transceiver measured transmitted currents of a track circuit, wherein the method comprises:
- calibrating a track circuit system according to a method disclosed herein;
- retrieving a railway vehicle movement profile based on a measured sequence of measured transmitted currents of the track circuit with respect to the time;
- determining the distance of the nearest axle of the railway vehicle with respect to a feed in point on the rail; and
- determining the position of the railway vehicle based on the distance.

According to a further aspect, a Computer-readable non-transitory storage medium is provided comprising instructions, which when executed by a computer, cause the computer to carry out the following steps:
- obtaining a railway vehicle movement profile, wherein the railway vehicle movement profile comprises a sequence of measured transmitted currents of a transceiver of a track circuit with respect to the time;
- normalizing the railway vehicle movement profile;
- extracting one or more features from the normalized railway vehicle movement profile;
- determining the distance of the extracted features with respect to each centroid of a railway vehicle movement profile type determined in a classification process; and
- assigning the railway vehicle movement profile to the railway vehicle movement profile type with the closest centroid.

According to another aspect, a controller of a track circuit system is provided, the track circuit system including a transceiver being connected to a pair of rails of a railway track and the controller receiving from the transceiver measured transmitted currents, wherein the controller is adapted to:
- obtain a railway vehicle movement profile, wherein the railway vehicle movement profile comprises a sequence of measured transmitted currents of a transceiver of a track circuit with respect to the time;
- normalize the railway vehicle movement profile;
- extract one or more features from the normalized railway vehicle movement profile;
- determine the distance of the extracted features with respect to each centroid of a railway vehicle movement profile type determined in a classification process; and
- assign the railway vehicle movement profile to the railway vehicle movement profile type with the closest centroid.

Further embodiments may relate to one or more of the following features, which may be combined in any technical feasible combination:
- the processor is further adapted prior to the normalizing step to smooth the railway vehicle movement profile;
- the smoothing is performed using one or more filters selected of the group of an exponential filter, a Savitzky-Golay filter and a Hodrick-Prescott Filter;
- the extracted features are one or more of the group selected of: Minimum of the first derivative, Maximum of the first derivative, Minimum of the second derivative, Maximum of the second derivative, Range of the first derivative, Range of the second derivative, Median of the first derivative, Median of the second derivative, Mean of the first derivative, Mean of the second derivative, Standard deviation of the first derivative, Standard deviation of the first derivative, Percentage of the first derivative being negative, Percentage of the second derivative being negative, and/or ABC surface value, wherein the features are calculated from the normalized railway vehicle movement profile.
- the classification process for determining the centroids comprises:
  - obtaining a plurality of reference railway vehicle movement profiles for each railway vehicle movement profile type, wherein for each reference railway vehicle movement profile the railway vehicle profile type is known;
  - normalizing each of the reference railway vehicle movement profiles; and
  - extracting one or more features for each of the normalized reference railway vehicle movement profile;
  - determining for each railway vehicle movement profile type the centroid of the extracted features.
- the plurality of railway vehicle movement profiles comprise an accelerating railway vehicle, a railway vehicle with a constant speed and a decelerating railway vehicle.

The written description uses examples to disclose the invention, including the best mode, and also to enable any person skilled in the art to make and use the invention. While the invention has been described in terms of various specific embodiments, those skilled in the art will recognize that the invention can be practiced with modifications within the spirit and scope of the claims. The patentable scope of the invention is defined by the claims, and may include other examples that occur to those skilled in the art. Such other examples are intended to be within the scope of the claims.

What is claimed is:

1. A computer implemented method for determining railway vehicle movement profile type of a railway vehicle movement profile, wherein the railway vehicle movement profile comprises a sequence of measured transmitted currents of a transceiver of a track circuit with respect to the time, comprising
    obtaining a railway vehicle movement profile;
    normalizing the railway vehicle movement profile;
    extracting one or more features from the normalized railway vehicle movement profile;
    determining the distance of the extracted features with respect to each centroid of a railway vehicle movement profile type determined in a classification process; and
    assigning the railway vehicle movement profile to the railway vehicle movement profile type with the closest centroid.

2. The method according to claim 1, wherein the extracted features are one or more of the group selected of: Minimum of the first derivative, Maximum of the first derivative, Minimum of the second derivative, Maximum of the second derivative, Range of the first derivative, Range of the second derivative, Median of the first derivative, Median of the second derivative, Mean of the first derivative, Mean of the second derivative, Standard deviation of the first derivative, Standard deviation of the first derivative, Percentage of the first derivative being negative, Percentage of the second derivative being negative, and/or ABC surface value, wherein the features are calculated from the normalized railway vehicle movement profile.

3. The method according to claim 1, wherein, prior to normalizing step, the railway vehicle movement profile is smoothed.

4. The method according to claim 3, wherein the smoothing is performed using one or more filters selected of the group of an exponential filter, a Savitzky-Golay filter and a Hodrick-Prescott Filter.

5. The method according to claim 3, wherein the extracted features are one or more of the group selected of: Minimum of the first derivative, Maximum of the first derivative, Minimum of the second derivative, Maximum of the second derivative, Range of the first derivative, Range of the second derivative, Median of the first derivative, Median of the second derivative, Mean of the first derivative, Mean of the second derivative, Standard deviation of the first derivative, Standard deviation of the first derivative, Percentage of the first derivative being negative, Percentage of the second derivative being negative, and/or ABC surface value, wherein the features are calculated from the normalized smoothed railway vehicle movement profile.

6. The method according to claim 1, wherein the classification process for determining the centroids comprises:
obtaining a plurality of reference railway vehicle movement profiles for each railway vehicle movement profile type, wherein for each reference railway vehicle movement profile the railway vehicle profile type is known;
normalizing each of the reference railway vehicle movement profiles; and
extracting one or more features for each of the normalized reference railway vehicle movement profile;
determining for each railway vehicle movement profile type the centroid of the extracted features.

7. The method according to claim 6, wherein the plurality of railway vehicle movement profiles comprise an accelerating railway vehicle, a railway vehicle with a constant speed and a decelerating railway vehicle.

8. The method according to claim 6, wherein obtaining a plurality of reference railway vehicle movement profiles for each railway vehicle movement profile type includes simulating the respective railway vehicle movement profiles based on the characteristics of the track on which the railway vehicles moves.

9. The method according to claim 8, wherein the characteristics of the track include the lengths and the rail resistance.

10. The method according to claim 6, wherein the extracted features of the normalized reference railway vehicle movement profiles are one or more of the group selected of: Minimum of the first derivative, Maximum of the first derivative, Minimum of the second derivative, Maximum of the second derivative, Range of the first derivative, Range of the second derivative, Median of the first derivative, Median of the second derivative, Mean of the first derivative, Mean of the second derivative, Standard deviation of the first derivative, Standard deviation of the first derivative, Percentage of the first derivative being negative, Percentage of the second derivative being negative, and/or ABC surface value.

11. Method for calibrating a track circuit system, wherein the track circuit system includes a transceiver being connected to a pair of rails of a railway track and a controller receiving from the transceiver measured transmitted currents of a track circuit, the method comprising:
retrieving, by the controller, a plurality of railway vehicle movement profiles based respectively on a sequence of measured transmitted currents of the track circuit with respect to the time;
for each of the railway movement profiles, determining the railway vehicle movement profile type according to the method of claim 1;
retaining railway vehicle movement profiles of railway vehicles with a constant speed; and
calibrating, by the controller, the track circuit system based on the retained movement profiles.

12. The method according to claim 11, wherein the calibrating of the track circuit system uses a dynamic time warping process to estimate the transmitted current with respect to the railway vehicle location relationship.

13. Method for determining the position of a railway vehicle using a track circuit, wherein the track circuit system includes a transceiver being connected to a pair of rails of a railway track at a feed in point and a controller receiving from the transceiver measured transmitted currents of a track circuit, wherein the method comprises:
calibrating a track circuit system according to the method of claim 11;
retrieving a railway vehicle movement profile based on a measured sequence of measured transmitted currents of the track circuit with respect to the time;
determining the distance of the nearest axle of the railway vehicle with respect to a feed in point on the rail; and
determining the position of the railway vehicle based on the distance.

\* \* \* \* \*